United States Patent
Kim et al.

[11] Patent Number: 6,111,721
[45] Date of Patent: Aug. 29, 2000

[54] TRAY LOADING TYPE MAGNETIC RECORDING AND REPRODUCING APPARATUS FOR DIFFERENT SIZE TAPE CASSETTES

[75] Inventors: Woon-bae Kim; Min-pyo Hong; Rae-soo Park, all of Kyonggi-do, Rep. of Korea

[73] Assignee: Samsung Electronics, Co., Ltd., Kyungki-Do, Rep. of Korea

[21] Appl. No.: 09/105,266

[22] Filed: Jun. 26, 1998

[30] Foreign Application Priority Data

Sep. 27, 1997 [KR] Rep. of Korea ............ 97-27918

[51] Int. Cl.[7] ............................................. G11B 15/675
[52] U.S. Cl. ....................................................... 360/94
[58] Field of Search ................................. 360/94, 96.5

[56] References Cited

U.S. PATENT DOCUMENTS

| | | | |
|---|---|---|---|
| 4,903,149 | 2/1990 | Hasegawa et al. | 360/69 |
| 5,032,939 | 7/1991 | Mihara et al. | 360/94 |
| 5,237,470 | 8/1993 | Sasaki et al. | 360/96.5 |
| 5,357,385 | 10/1994 | Shimizu et al. | 360/96.5 |
| 5,566,368 | 10/1996 | Yamashita | 360/96.5 |
| 5,734,520 | 3/1998 | Okuda et al. | 360/85 |
| 5,739,979 | 4/1998 | Busch | 360/94 |
| 5,757,577 | 5/1998 | Yamanaka et al. | 360/94 |
| 5,854,723 | 12/1998 | Suzuki | 360/96.5 |

FOREIGN PATENT DOCUMENTS

| | | |
|---|---|---|
| 0 316 156A2 | 5/1989 | European Pat. Off. . |
| 0 354 783 A2 | 2/1990 | European Pat. Off. . |
| 58-169361 | 10/1983 | Japan . |
| 3-91145 | 4/1991 | Japan . |
| 4-103335 | 9/1992 | Japan . |
| 8-161805 | 6/1996 | Japan . |
| 9-106594 | 4/1997 | Japan . |
| 10-302348 | 11/1998 | Japan . |
| 2 293 914 | 4/1996 | United Kingdom . |

*Primary Examiner*—Jefferson Evans
*Attorney, Agent, or Firm*—Sughrue, Mion, Zinn, Macpeak & Seas, PLLC

[57] ABSTRACT

The present invention is related to a tray loading type magnetic recording and reproducing apparatus. The tray loading type magnetic recording and reproducing apparatus includes a deck mechanism for accommodating different size tape cassettes, a cassette housing covered and fixed at the upper surface of the deck mechanism, a cassette tray combined with the cassette housing in such a manner that the cassette tray can be rectilinearly moved back and forth and being capable of selectively accommodating different size tape cassettes, a tray loading device for loading the cassette tray and a cassette holder receiving device for receiving a previously received tape cassette in the cassette tray in a predetermined position of the deck mechanism. Thus, a new formed tray loading type magnetic recording and reproducing apparatus for accommodating different sized tape cassettes, capable of simplifying its formation, reducing fabricating cost and using in a home is provided.

23 Claims, 39 Drawing Sheets

FIG. 23
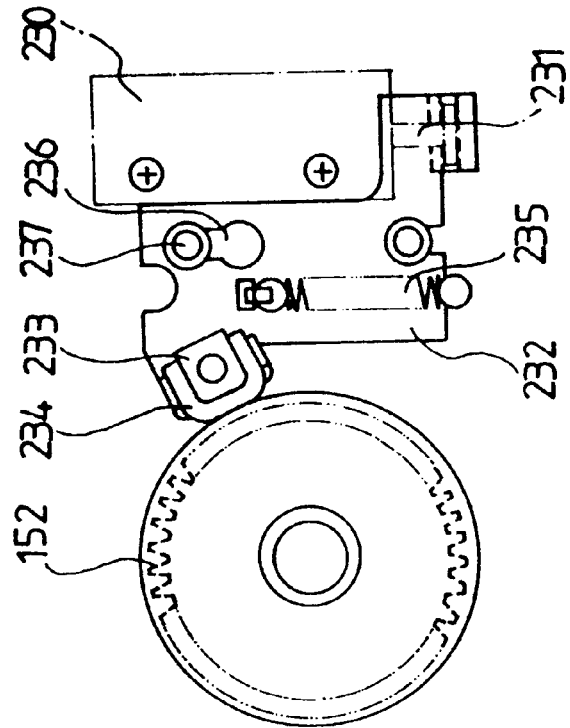
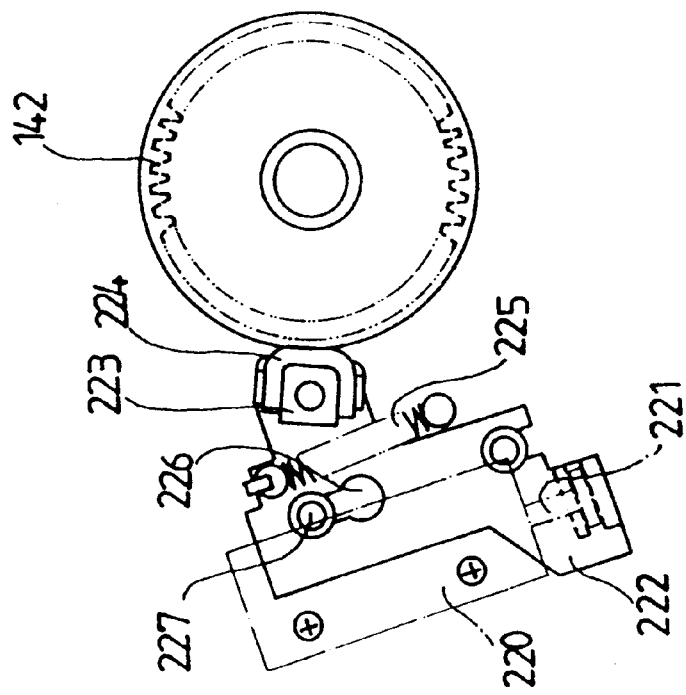

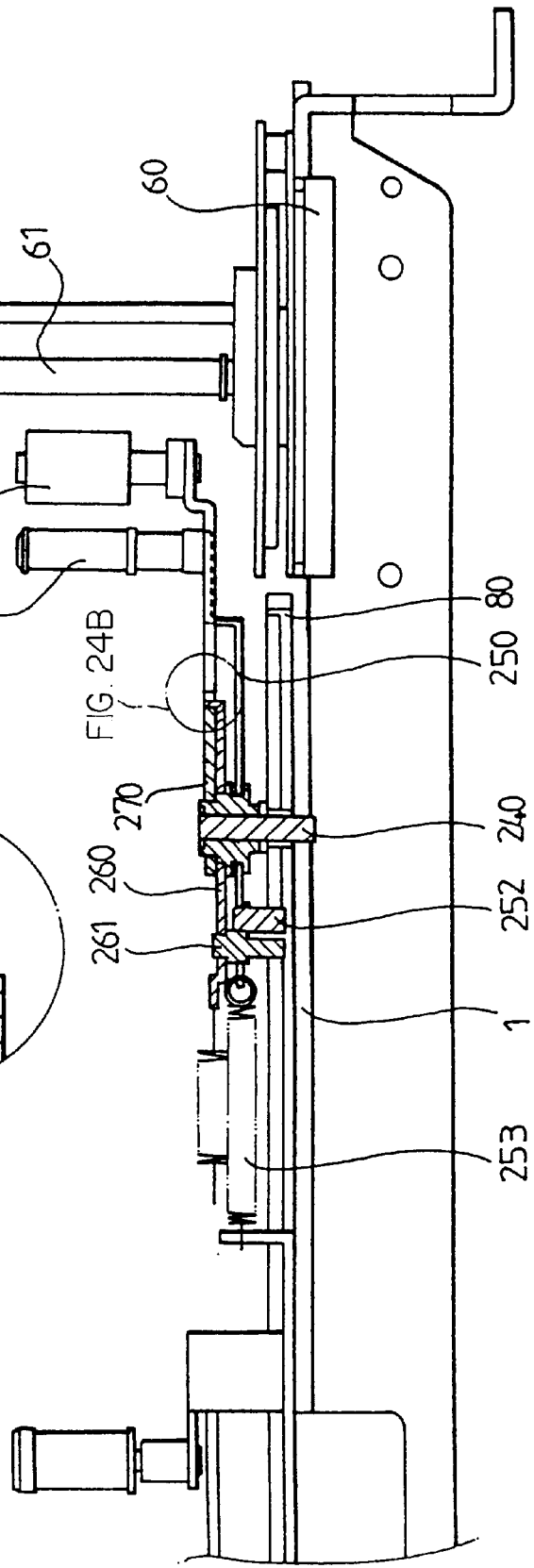
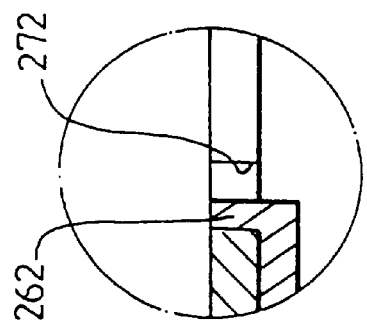
FIG. 24A
FIG. 24B

TRAY LOADING TYPE MAGNETIC RECORDING AND REPRODUCING APPARATUS FOR DIFFERENT SIZE TAPE CASSETTES

BACKGROUND OF THE INVENTION

1. Field of the Invention

The present invention relates to a tray loading type magnetic recording and reproducing apparatus such as a VCR (Video Cassette Recorder), a D-VCR (Digital Video Cassette Recorder), a HD D-VCR (High Resolution Digital Video Cassette Recorder), a camcorder and the like. More particularly, the present invention relates to a new tray loading type magnetic recording and reproducing apparatus for selectively using different sized two-typed tape cassettes by applying tray loading type.

2. Description of the Related Art

Recently, with the improvement of general standard of life, many magnetic recording and reproducing apparatuses such as a VCR, a D-VCR, a HD D-VCR and a camcorder are broadly used. Generally, according to the loading mechanism, the magnetic recording and reproducing apparatuses are classified into a front loading type which a tape cassette is loaded into a front of the main chassis by smooth push, a tray loading type which a tape cassette is loaded into a main chassis by using a slidably movable tray, a top loading type which a tape cassette is loaded into an upper surface of the main chassis and a side loading type, which a tape cassette is loaded into a side of the main chassis.

Such a front, a tray, a top and a side loading types are selectively applied to a magnetic recording and reproducing apparatus considering installation environment, usage environment, composition, function and production cost.

Considering diverse desire of users, tape cassettes are formed of various materials and are recorded in different manners and fabricated by different methods and have a copying protecting function. Also, the sizes of the tape cassettes vary.

In addition, with the improvement of technology in the magnetic recording and reproducing apparatus industry, a technology for selectively using different sized tape cassettes in a single magnetic recording and reproducing apparatus is being attempted.

There have been disclosed various techniques for accommodating different sized tape cassettes in a front loading type magnetic recording and reproducing apparatus. But there has been no technique for accommodating different sized tape cassettes in a tray loading type magnetic recording and reproducing apparatus, so, for fulfilling various needs of users, the tray loading type magnetic recording and reproducing apparatuses for accommodating different sized tape cassettes are needed.

On the other side, many tray loading type magnetic recording and reproducing apparatus systems are eqquipped for accommodating different sized tape cassettes in a broadcasting station, but they have only restricted use for the broadcasting station because their total system has a large size, their formation is very complicated and their cost is much higher than home appliances.

SUMMARY OF THE INVENTION

It is therefore an object of the present invention to provide a new tray loading type magnetic recording and reproducing apparatus for accommodating different sized tape cassettes, capable of simplifying its formation, reducing fabricating cost and using in a home.

To achieve the object of the present invention, a tray loading type magnetic recording and reproducing apparatus comprises a deck mechanism for accommodating different sized two-typed tape cassettes, a cassette housing covered and fixed at the upper surface of the deck mechanism and a cassette tray combined with the cassette housing in such a manner that the cassette tray can be rectilinearly moved back and forth and being capable of selectively accommodating different sized tape cassettes.

BRIEF DESCRIPTION OF THE DRAWINGS

The above objects and advantages of the present invention will become more apparent from the following detailed description when read in connection with the accompanying drawings, wherein:

FIGS. 1A and 1B illustrate formations of a tray loading type magnetic recording and reproducing apparatus of the present invention, wherein:

FIG. 1A is a plan view illustrating the state when a cassette tray is ejected; and FIG. 1B is a plan view illustrating tray loading means in an ejected state;

FIGS. 5 and 6 illustrate a standard tape cassette applying to a tray loading type magnetic recording and reproducing apparatus of the present invention, wherein:

FIG. 5 is a perspective view; and

FIG. 6 is a bottom view;

FIGS. 7 and 8 illustrate a small tape cassette applying to the tray loading type magnetic recording and reproducing apparatus of the present invention, wherein:

FIG. 7 is a perspective view; and

FIG. 8 is a bottom view;

FIGS. 11A through 11C illustrate mode sensing means comprising the tape loading device of FIG. 9, wherein:

FIG. 11A is a plan view of an FPC (Flexible Printed Circuit);

FIG. 11B is a rear view of a program switch gear; and

FIG. 11C is a sectional view illustrating the state when the program switch gear is combined;

FIGS. 12 and 13 illustrate pole base driving means of the tape loading device comprising the tray loading type magnetic recording and reproducing apparatus of the present invention, wherein:

FIG. 12 is a fragmentary sectional side elevation view of supply part pole base driving means; and FIG. 13 is a fragmentary sectional side elevation view of take up part pole base driving means;

FIGS. 15 through 18 illustrate a reel moving device of the tray loading type magnetic recording and reproducing apparatus of the present invention, wherein:

FIG. 15 is a plan view illustrating the state when the standard tape cassette is in using;

FIG. 16 is a plan view illustrating the state when the small tape cassette is in using; and FIGS. 17 and 18 are sectional views of the different sectional directions for explaining height relation;

FIGS. 22 and 23 illustrate a reel brake device of the tray loading type magnetic recording and reproducing apparatus of the present invention, wherein:

FIG. 22 is a plan view illustrating the state when a brake is turned off; and

FIG. 23 is a plan view illustrating the state when the brake is turned on;

FIG. 24 is a fragmentary sectional side elevation view illustrating a pinch roller and a review pole driving devices of the tray loading type magnetic recording and reproducing apparatus of the present invention;

FIGS. 25 through 29 illustrate the deck mechanism of the tray loading type magnetic recording and reproducing apparatus of the present invention, wherein:

FIG. 25 is a plan view of an ejected mode;

FIG. 26 is a plan view of an unloading stop mode;

FIG. 27 is a plan view of a stop mode;

FIG. 28 is a plan view of a play mode; and

FIG. 29 is a plan view of a fast forward and a rewinding mode;

FIGS. 30 and 31 illustrate lid opening means for opening a tape cassette lid applying to the tray loading type magnetic recording and reproducing apparatus of the present invention, wherein:

FIG. 30 is a perspective view of a single body type lid opener; and

FIG. 31 is a side view illustrating the state when lids of a standard tape cassette and a small tape cassette are opened;

FIGS. 39 through 41 illustrate a mid-door opening and closing device of the tray loading type magnetic recording and reproducing apparatus of the present invention, wherein:

FIGS. 39 and 40 are fragmentary sectional side elevation views illustrating the opening and closing operation of the mid-door; and FIG. 41 is a front view of the mid-door;

FIGS. 42 through 48 illustrate a cassette tray of the tray loading type magnetic recording and reproducing apparatus of the present invention, wherein:

FIG. 42 is a plan view illustrating the state when the small tape cassette is received;

FIG. 43 is an enlarged plan view illustrating the principal part formation of the cassette tray;

FIG. 44 is a plan view illustrating the state when the standard tape cassette is received;

FIG. 45 is a side view illustrating shape of a detect boss;

FIG. 47 is a fragmentary sectional side elevation view illustrating the state when the lock releasing fragment is installed as shown in FIGS. 46a and 46b; and FIG. 48 is a fragmentary sectional plan view illustrating the state when a lid of the small tape cassette is locked;

FIGS. 49 through 51 illustrate operation detecting means of the tray loading type magnetic recording and reproducing apparatus of the present invention, wherein:

FIG. 49 is a side view illustrating the state when a program switch gear is installed;

FIG. 50 is a plan view of an FPC (Flexible Printed Circuit); and

FIG. 51 is an enlarged plan view illustrating the state when the program switch gear is combined;

FIGS. 52 through 54 illustrate a cassette holder pressurizing device of the tray loading type magnetic recording and reproducing apparatus of the present invention, wherein:

FIG. 52 is a side view; and

FIGS. 53 and 54 are side views illustrating formation of the principal part and function of the cassette holder pressurizing device.

DETAILED DESCRIPTION OF THE PREFERRED EMBODIMENTS

The tray loading type magnetic recording and reproducing apparatus according to the present invention will be described in detail hereinafter referring to the accompanying drawings. For purposes of description, elements having basically the same function are identified using common reference numbers throughout the drawings.

As shown in FIGS. 1 through 8, the tray loading type magnetic recording and reproducing apparatus of the present invention includes: a deck mechanism 100 for accommodating different sized two-typed tape cassettes C10 and C20; a cassette housing 300 covered and fixed at the top of the deck mechanism 100; a cassette tray 500 combined with the cassette housing 300 so that the cassette tray can be rectilinearly moved back and forth and being capable of selectively accommodating different sized tape cassettes C10 and C20; a tray loading device for loading the cassette tray 500; and a cassette holder receiving device for receiving a tape cassette C10 or C20 received in the cassette tray 500 at a predetermined position of the deck mechanism 100.

For the purposes of description, among the tape cassettes C10 and C20 as shown in FIGS. 5 through 8, a relatively large-sized tape cassette C10 and a relatively small-sized tape cassette C20 will be hereinafter referred a standard tape cassette and a small tape cassette, respectively.

Figure 14:
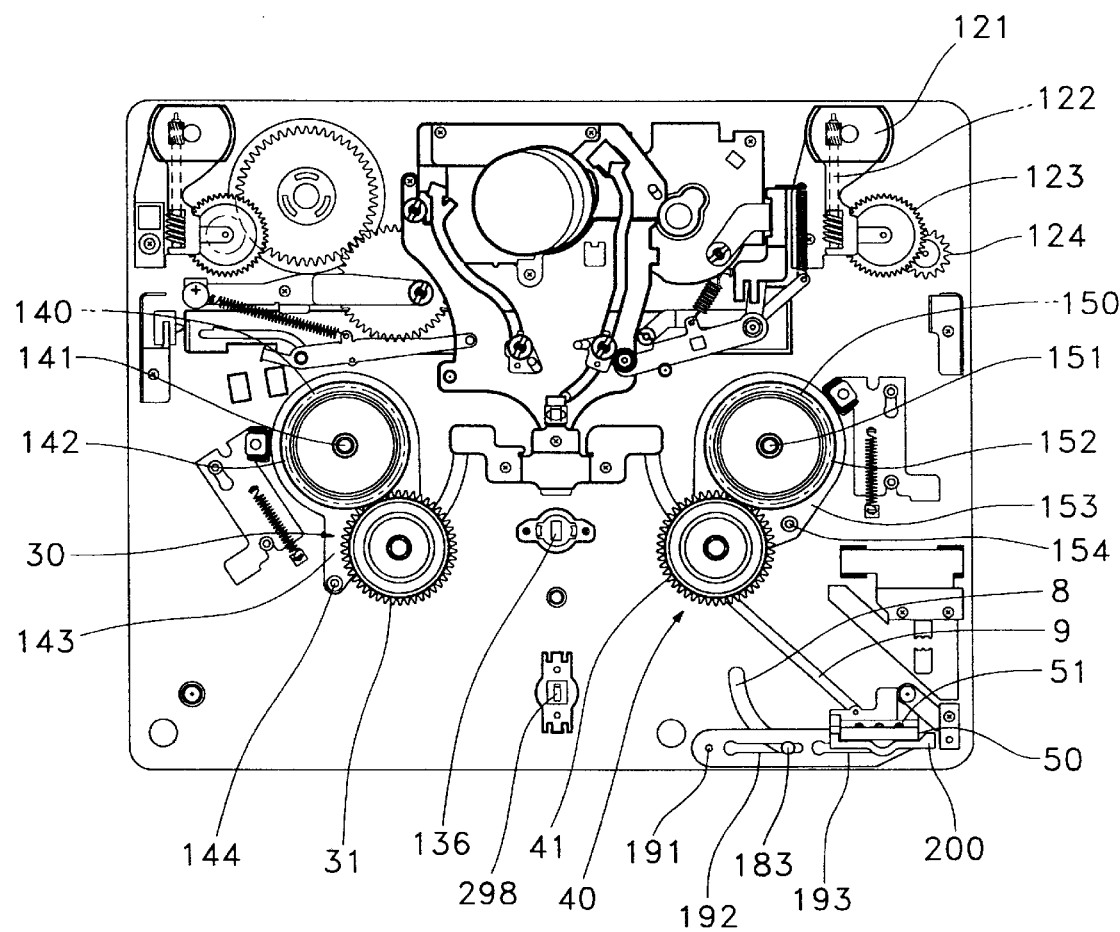
FIG. 14 is a plan view illustrating a loading mechanism of the tray loading type magnetic recording and reproducing apparatus of the present invention.
Figure 25:
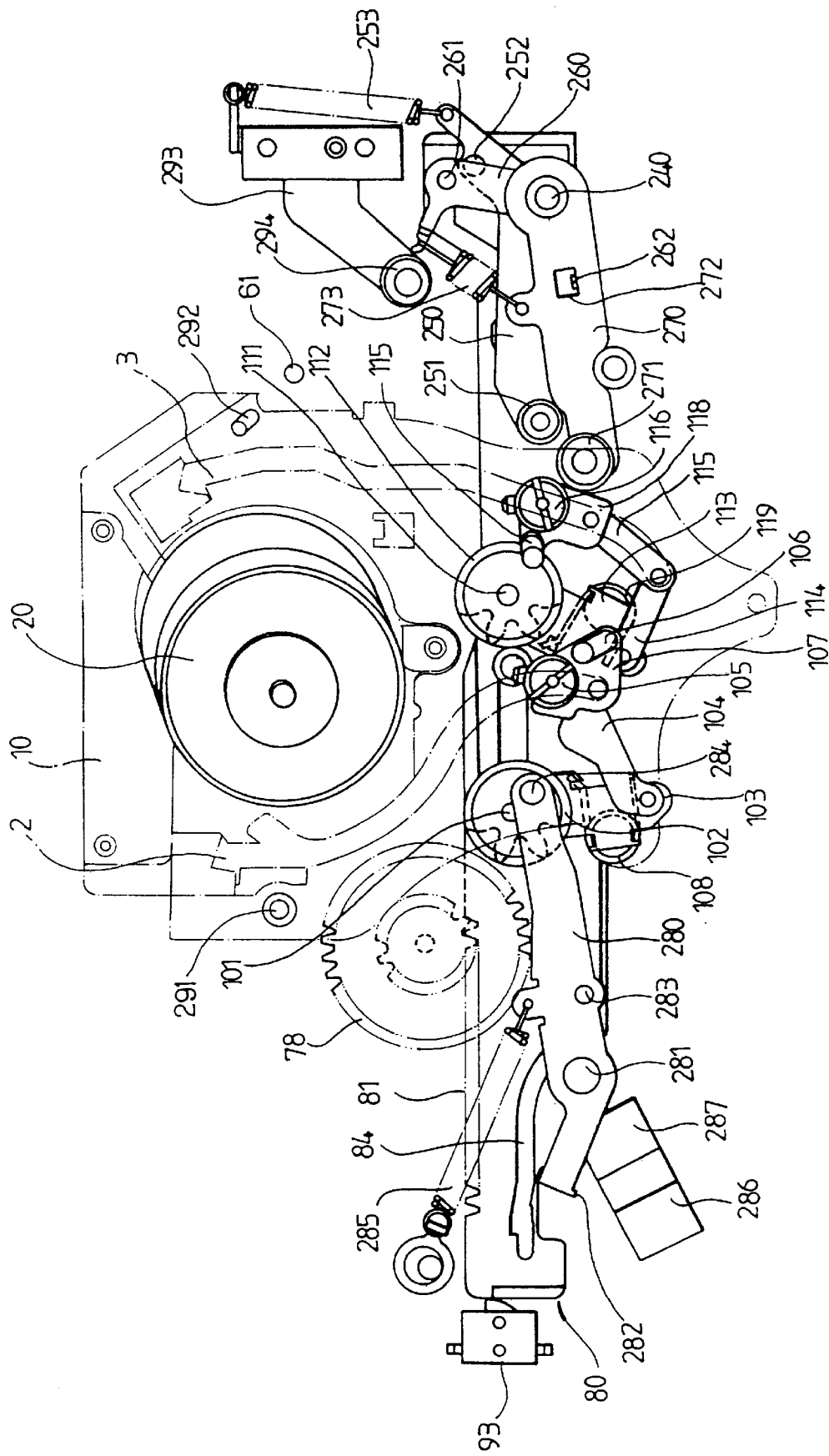

The deck mechanism 100 of the tray loading type magnetic recording and reproducing apparatus includes: a quadrilateral plate-shaped main chassis 1; a drum base 10 fixed at the rear side of the main chassis 1 with predetermined height difference and which respectively forms loading guide grooves 2 and 3 having predetermined shapes are formed in each side thereof and stoppers 4 and 5 in the rear side of the loading guide grooves 2 and 3 are formed; a rotating head drum device 20 (which is shown in FIG. 25), equipped with a magnetic head (not shown here) that reproduces magnetic signals of a tape and inputs magnetic signals to a tape and fixed to a predetermined position of the drum base 10 with a predetermined slant; a tape loading device for loading the tape of the tape cassettes C10 and C20 to their traveling position; a reel moving device, equipped with a supply reel 30 and a take up reel 40 which is installed at the center of the main chassis 1 capable of moving along a predetermined path and moving a supply reel 30 and take up reel 40 to a predetermined position according to the kinds of cassette tapes C10 and C20; a switch moving device, equipped with a MIC switch (Memory In Cassette Switch) 50 (which is shown in FIG. 14) which is installed at one side of the main chassis 1 capable of moving along a predetermined path and interlocking with the reel moving device; a reel brake device for providing a predetermined braking power to the supply reel 30 and the take up reel 40; a capstan motor 60 and pinch roller driving devices, having a capstan shaft for traveling a tape loaded by the tape loading device; a tape tension device for providing a predetermined tension to the tape; and tape guide means, installed at a predetermined position of the main chassis 1 for guide traveling of the tape.

The above-mentioned tape loading device according to the drawings will be described in detail hereinafter.

As shown in FIGS. 1 through 13, the tape loading device applying to the tray loading type magnetic recording and reproducing apparatus of the present invention includes: a loading motor 71, fixed in an upright manner at a rear left corner portion of the main chassis 1; a worming gear shaft 72, rotated by the power of the loading motor 71; the first loading gear 73, rotated by the rotation of the worming gear shaft 72; a program switch gear 75 (that is also referred as a mode switch gear), rotated by the rotation of the first loading gear 73 and having a fixed elastic brush 74 at a lower surface; a FPC (Flexible Printed circuit Cable) 76 for sensing the rotational angle of the program switch gear 75, fixed to an upper surface of the main chassis 1, which corresponds to a lower surface of the program switch gear 75, and which a predetermined pattern is formed in an upper surface thereof, contacts with an elastic brush 74; the second loading gear 78, rotated by the rotation of the program switch gear 75; a loading plate 80, equipped with a rack unit 81 which is geared with the second loading gear 78 with a predetermined length in one side and rectilinearly moved back and forth on the upper surface of the main chassis 1 by rotation of the second loading gear 78; and pole base driving means, which moves along the loading guide grooves 2 and 3 of the drum base 10 by the movement of the loading plate 80 and moves a tape to a traveling path.

Figure 10:
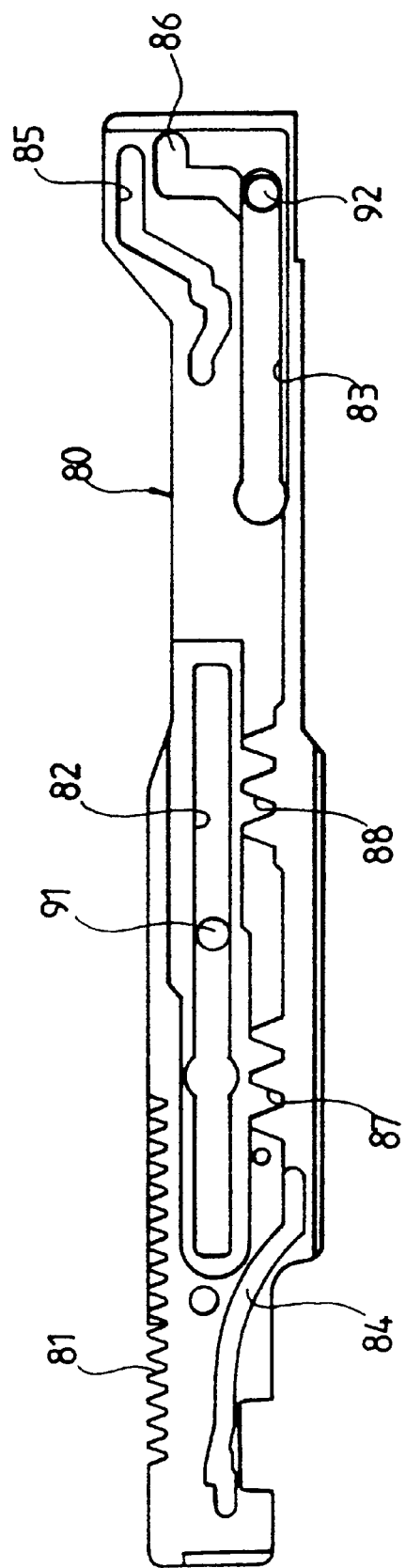
FIG. 10 is a plan view of a loading plate comprising a tape loading device.
Figure 11A:
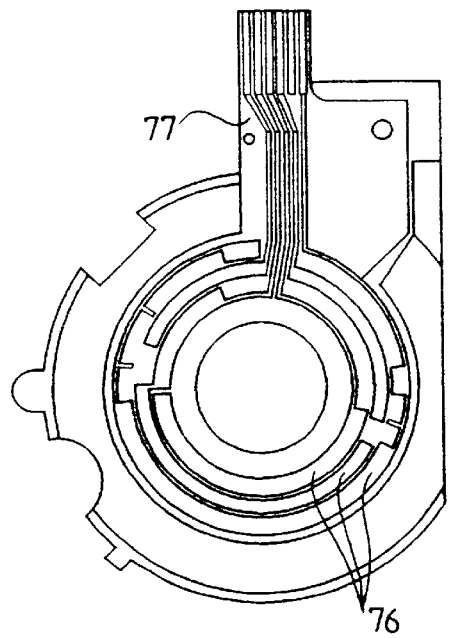
Figure 11B:
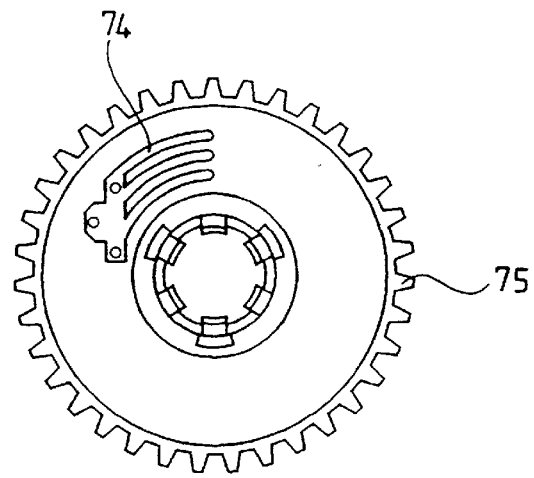
Figure 11C:
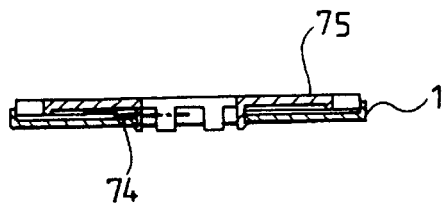
Figure 12:
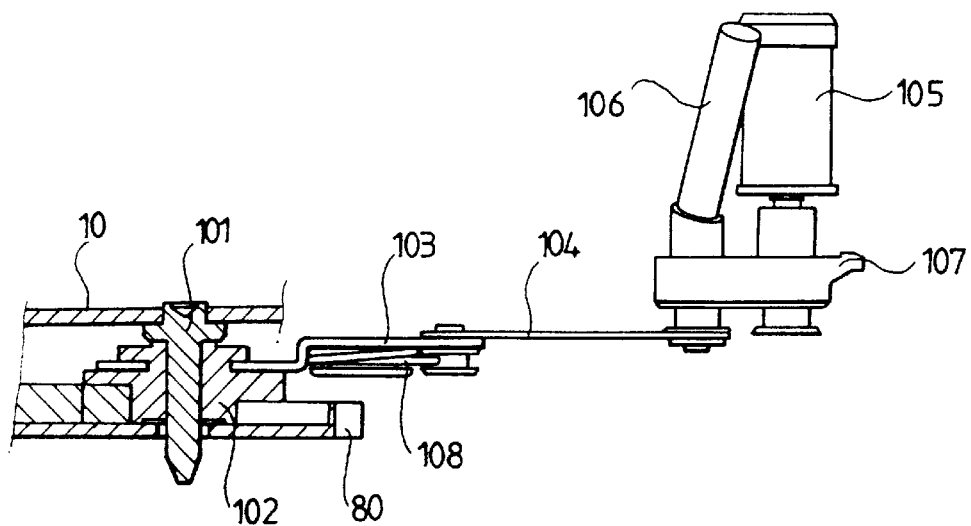
Figure 13:
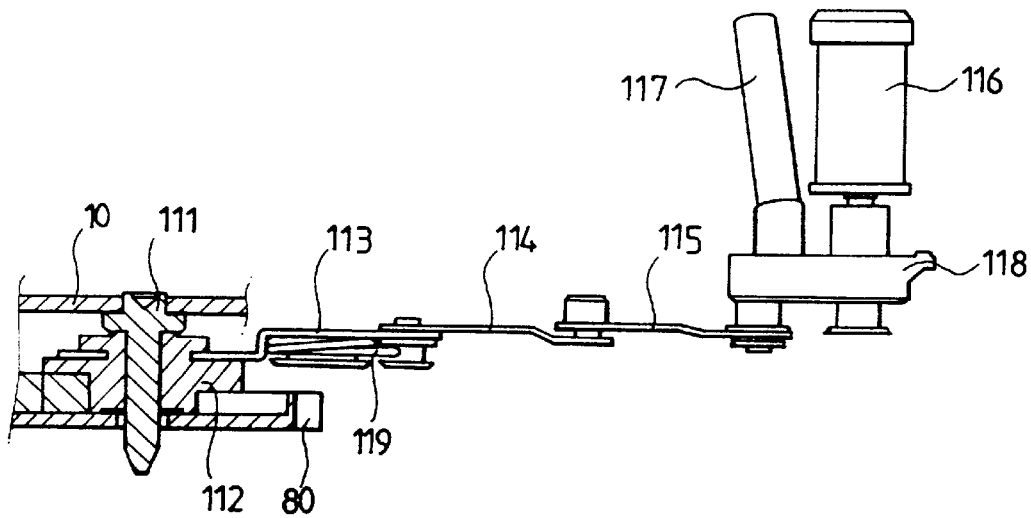

As shown in FIG. 10, the above-mentioned loading plate 80 includes: guide slots 82 and 83 for insertion of the guide pins 91 and 92 respectively fixed at predetermined portion of the main body 1; a tension lever driving cam groove 84; a pinch arm driving cam groove 85; and a review arm driving cam groove 86 and gear teeth 87 and 88 for driving the pole base driving means.

As shown in FIGS. 9 through 13, the above-mentioned pole base driving means includes: shaft pins 101 and 111, respectively downward fixed to both sides of lower surface of the loading base 10 and respectively perforating guide slot 82 of the loading plate 80; a supply part and a take up part loading arm gears 102 and 112, rotatably connected to the shaft pins 101 and 111 and respectively geared with each gear teeth 87 and 88 of the loading plate 80; a supply part and a take up part loading arms 103 and 113, respectively fixed to the loading arm gears 102 and 112; a supply part loading link 104 and the first and the second loading links 114 and 115 respectively rotatably connected to the loading arms 103 and 113; a supply part base pole 107, rotatably connected to an end portion of the supply part loading link 104 and having a supply part guide roller 105 and a slant pole 106 fixed to both sides of upper surface thereof; a take up part base pole 118, rotatably connected to an end portion of the second loading link 115 and having a take up part guide roller 116 and a slant pole 117 fixed to both sides of an upper surface thereof; and elastic members 108 and 119 such as torsion springs, respectively located between the supply part loading arm 103 and the loading link 104 and between the take up part loading arm 113 and the first loading link 114 and applying pressing power when the loading of the supply part and take up part pole bases 107 and 118 are finished.

When the loading plate 80 deviates from its range according to abnormal operation, the position of the loading plate 80 is sensed by a switch 93, the signal sensed by the switch 93 is transmitted to the loading motor 71 and the movement of the loading plate 80 is stopped. Moreover, the switch 93 executes as a safety device for preventing overload which is caused by malfunction of the loading motor 71 and a plurality of loading gears, consequently, the moving position of the loading plate 80 is controlled by the program switch 77.

As shown in FIGS. 14 through 19, the reel driving and moving device includes: a driving motor 121, fixed in an upright manner at a rear right corner portion of the main chassis 1; a worm gear shaft 122, rotated by the power of the driving motor 121; the first driving gear 123, rotated by the rotation of the worm gear shaft 122; the second driving gear 124, rotated by the rotation of the first driving gear 123; the third driving gear 125, rotatably supported on a predetermined position of the lower surface of the main chassis 1 and geared with the second driving gear 124; a moving plate 130, rectilinearly moved back and forth at the lower surface of the main chassis 1; a rack 126, fixed to one of corner portions of the moving plate 130 and geared with the third driving gear 125; a supply part and a take up part reel motors 140 and 150, respectively fixed to both sides of the lower surface of the main chassis 1 with a predetermined distance and respectively having rotating shafts 141 and 151 protruded to the upper surface of the main chassis 1; reel driving gears 142 and 152, respectively connected and fixed to the shafts 141 and 151 of the supply part and take up part reel motors 140 and 150; reel brackets 143 and 153, respectively located between the main chassis 1 and the supply part reel driving gear 142 and between the main chassis 1 and the take up part reel driving gear 152, coaxially connected to the supply part and the take up part reel driving gears 142 and 152 and respectively installing the supply and take up reels 30 and 40 at one side portion; supporting posts 144 and 154, respectively supporting the small tape cassette C20 to a predetermined height in an upright manner at each predetermined portion of the upper surface of the reel brackets 143 and 153; interlocking members 145 and 155 combined with the moving plate 130 at both sides so that the interlocking members 145 and 155 can be rectilinearly moved back and forth and rotating the reel brackets 143 and 153 in a predetermined direction by the movement of the moving plate 130; and elastic members 146 and 156 such as a torsion spring, respectively installed for elastically supporting the interlocking members 145 and 155.

The supply and take up reels 30 and 40 equip with reel gears 31 and 41 for gearing with the supply part and the take up part reel driving gears 142 and 152. And, center shafts 32 and 42 of the supply and take up reels 30 and 40 support rotating and moving operation of the reel brackets 143 and 153 because they are inserted to arc type guide slots 6 and 7, wherein the arc type guide slots 6 and 7 are formed at both sides of the main chassis 1.

Guide slots 131 and 132 are respectively formed at both predetermined side portions of the moving plate 130 and the moving plate 130 can be rectilinearly moved left and right through guide pins 161 and 162, which guide pins 161 and 162 are fixed at a predetermined portion of the lower surface of the main chassis 1.

The reel brackets 143 and 153 respectively include perforating holes 143*a* and 153*a* at center portions thereof for passing the rotating shafts 141 and 151 of the supply part and the take up part reel motors 140 and 150. A plurality of arc slots 143*b* and 153*b* are respectively formed around circumferences of the perforating holes 143*a* and 153*a*. The plurality of arc slots 143*b* and 153*b* are fitted with a plurality of guide pins 163 and 164 formed on the main chassis 1. Accordingly, the reel brackets 143 and 153 can be rotated to a predetermined angle by guidance of the arc slots 143*b* and 153*b* and the guide pins 163 and 164. Combining pins 147 and 157 connected to the interlocking member 145 and 155 are fixed to the lower surface of the reel brackets 143 and 153.

The interlocking members 145 and 155 can be rectilinearly moved back and forth with guidance of a plurality of guide slots 133 and 134 fixed to the interlocking members 145 and 155 and a plurality of guide pins 171 and 172 formed on the moving plate 130. Elastic members 146 and 156 are respectively located between the interlocking members 145 and 155 and the moving plate 130.

Figure 20:
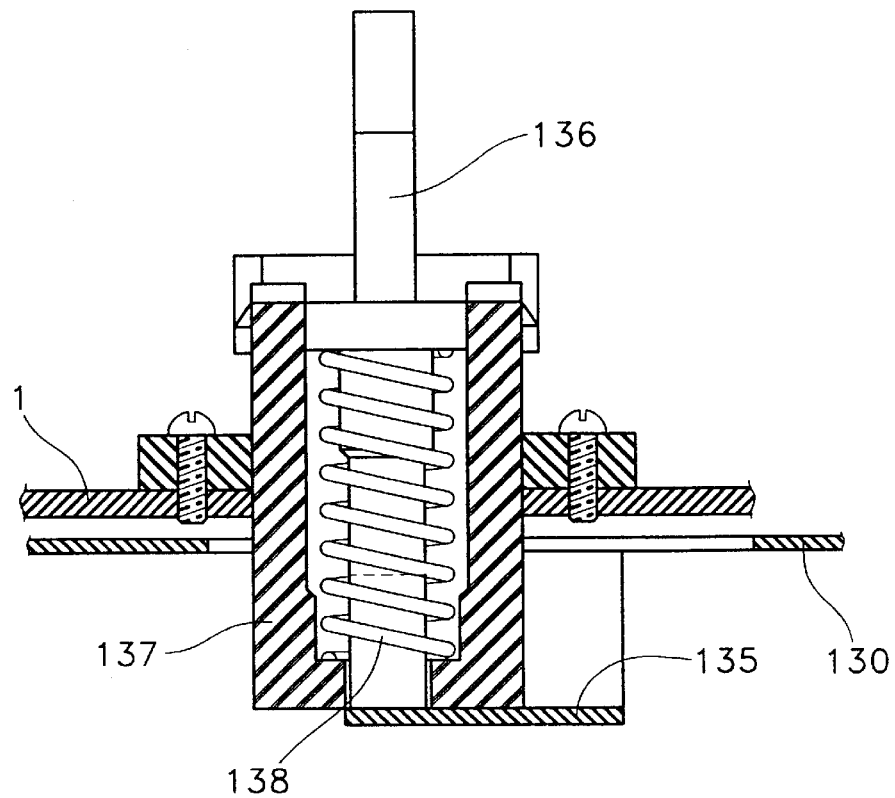
FIG. 20 is a sectional view illustrating a small tape cassette release of the tray loading type magnetic recording and reproducing apparatus of the present invention.

Also, as shown in FIG. 20, a hooking recess 135 is downward folded at a predetermined center position of the moving plate 130 and it prevents descending of the small tape cassette release 136, as mentioned later.

In other words, the small tape cassette release 136 is combined with inside of the release housing 137 fixed at a predetermined portion of the main chassis 1 so that can be moved downwardly and upwardly and upward elastically supported by an elastic member 138 such as a compression coil spring. When it receives the standard tape cassette C10, the hooking recess 135 of the moving plate 130 is parted from the lower portion of the small tape cassette release 136 and the small tape cassette release 136 is descended by the receiving operation of the standard tape cassette C10 with overcoming the elasticity of the elastic member 138. When it receives the small tape cassette C20, the moving plate 130 moves for locating the hooking recess 135 at the right lower portion of the small tape cassette release 136 and prevents the descending of the small tape cassette release 136, and accordingly, the small tape cassette release 136 releases locked state of the small tape cassette C20.

As shown in FIGS. 14 through 20, the aforementioned switch moving device includes; connecting means, installed at one predetermined portion of the side periphery of the moving plate 130; the first operating member 180, rotatably coupled with the lower surface of the main chassis 1 by a shaft pin 181, having a hooking pin 182 connected to the connecting means and fixed to one end portion, a connecting pin 183 inserted and guided to an arc slot 8 which is formed at a predetermined portion of the main chassis 1 and fixed to another end portion; the second operating member 190, rotatably coupled with the predetermined upper portion of the of the main chassis 1 by a shaft pin 191 and forming the first and the second guide slots 192 and 193, that guide the connecting pin 183 of the first operating member 180 in each side; and a slider that forms a guide pin 201, which is inserted to the second guide slot 193 of the second operating member 190 in one side portion, slidably couples with a slant slot 9, which is formed toward the center at the front corner portion of the main chassis 1 and fixes the MIC switch 50 at the upper portion.

Figure 21:
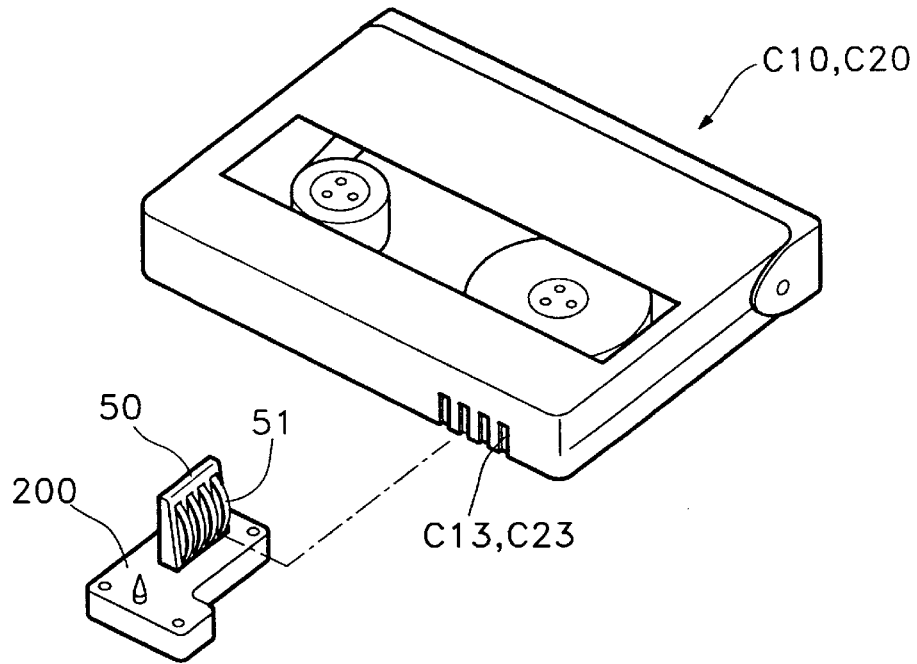
FIG. 21 is a perspective view illustrating tape cassette sensing means of the tray loading type magnetic recording and reproducing apparatus of the present invention.

The MIC switch 50 reads data such as tape materials, recording methods, fabricating methods and recording protecting function of the standard and small tape cassettes C10 and C20, respectively. As shown in FIG. 21, the MIC switch equipped with a plurality of operating terminals 51 and for contacting the operating terminals 51 of the MIC switch 50 outer terminals C13 and C23 are formed at the predetermined portion of the standard and small tape cassette tapes C10 and C20, respectively.

For the purpose of easily understanding, the standard tape cassette C10 and the small tape cassette C20 are illustrated as the same part in FIG. 21.

The connecting means includes: a pair of the first connecting member 214 and the second connecting member 215 which are rotatably coupled with a predetermined portion of the moving plate 130 about hinge units 212 and 213 for forming a hooking space part 211 that hooks a hooking pin 182 of the first operating member 180; and an elastic member 216 such as a tension coil spring for connecting the first connecting member 214 and the second connecting member 215.

Figure 22:
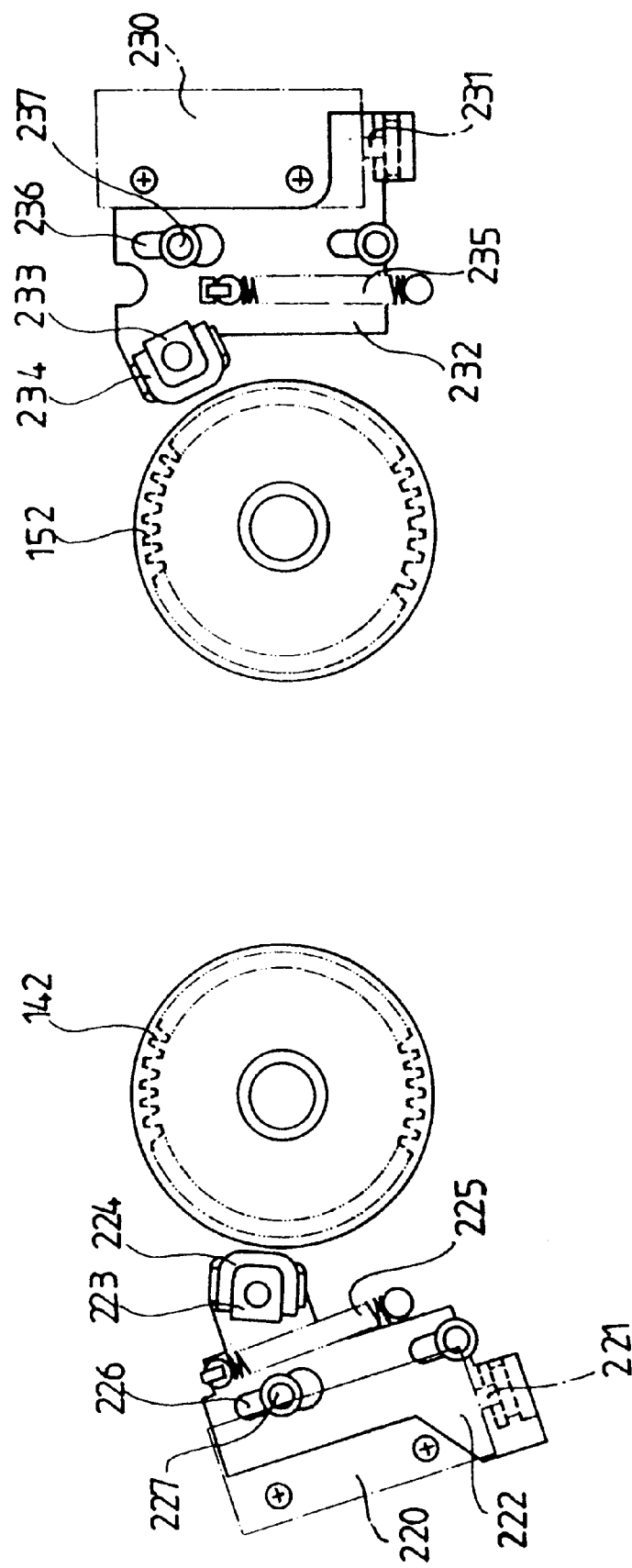

In the mean time, as shown in FIGS. 22 and 23, the reel brake device includes solenoids 220 and 230 respectively equips with rectilinearly movable plungers 221 and 223 and are respectively fixed to both side portions of the main chassis 1; brake levers 222 and 232, coupled with both side portions of the main chassis 1 so that the brake levers 222 and 232 can be rectilinearly moved back and forth and coupled with each plunger 221 and 231 of the solenoids 220 and 230, respectively; fixing units 223 and 233, respectively formed at one upper surface of the brake levers 222 and 232; brake bands 224 and 234 such as rubber, contacted to the peripheries of the reel driving gears 142 and 152 with predetermined pressure by respectively combining with fixing units 223 and 233; and elastic members 225 and 235 such as a tension coil spring for elastically supporting the brake levers 222 and 232 in one direction.

The brake levers 222 and 232 include guide slots 226 and 236 and can be rectilinearly moved back and forth with guidance of the guide pins 227 and 237 which are fixed to a predetermined position of the main chassis 1.

As shown in FIGS. 24 and 25, the pinch roller driving means includes a shaft pin 240 fixed to the predetermined portion of the main chassis 1 and rotatably coupled with a review arm 250, a pinch plate 260 and a pinch arm 270.

The review arm 250 includes: a review pole 251 in one upper end portion; a guide pin 252 which is fixed to the review arm 250 and inserted to a review arm driving cam groove 86 of the loading plate 80 in the lower surface; and an elastic member 253 such as a tension coil spring in one end portion for connectively fixing. And it has the rotatory power always about the shaft pin 240 in a counterclockwise direction.

The pinch plate 260 includes: a hook guide pin 261 that hooks the review arm 250 and is inserted to and guided by the pinch lever driving cam groove 85 of the loading plate 80 in one end portion; and a hooking part 262 that is folded at another end portion.

The pinch arm 270 includes: a pinch roller 271 rotatably installed at the upper end portion of the pinch arm 270; a hooking hole 272 which hooks a hooking part 262 of the pinch plate 260 in the center portion of the pinch arm 270; and an elastic member 273 such as a tension coil spring for connecting the pinch arm 270 and the pinch plate 260.

As shown in FIG. 25, the tape tension device includes: a tension lever 280 which is rotatably coupled with the predetermined portion of the main chassis about the shaft pin 281, forms a fold 282 in one end portion and a guide pin 283 inserted and guided to the tension lever driving cam groove 84 of the loading plate 80 in the lower portion; a tension post 284 fixed to the upper end portion of the tension lever 280; a tension spring such as a tension coil spring which is connectively fixed to the tension post 284 for elastically supporting the tension post 284, that having rotatory power about the shaft pin 240 in a counterclockwise direction; and light emitting and a light receiving sensors 286 and 287, respectively fixed to predetermined portion of the main chassis 1 for controlling wound tape tension on the tension post 284 by sensing the position of a fold 282 of the tension lever 280.

Figure 1A:
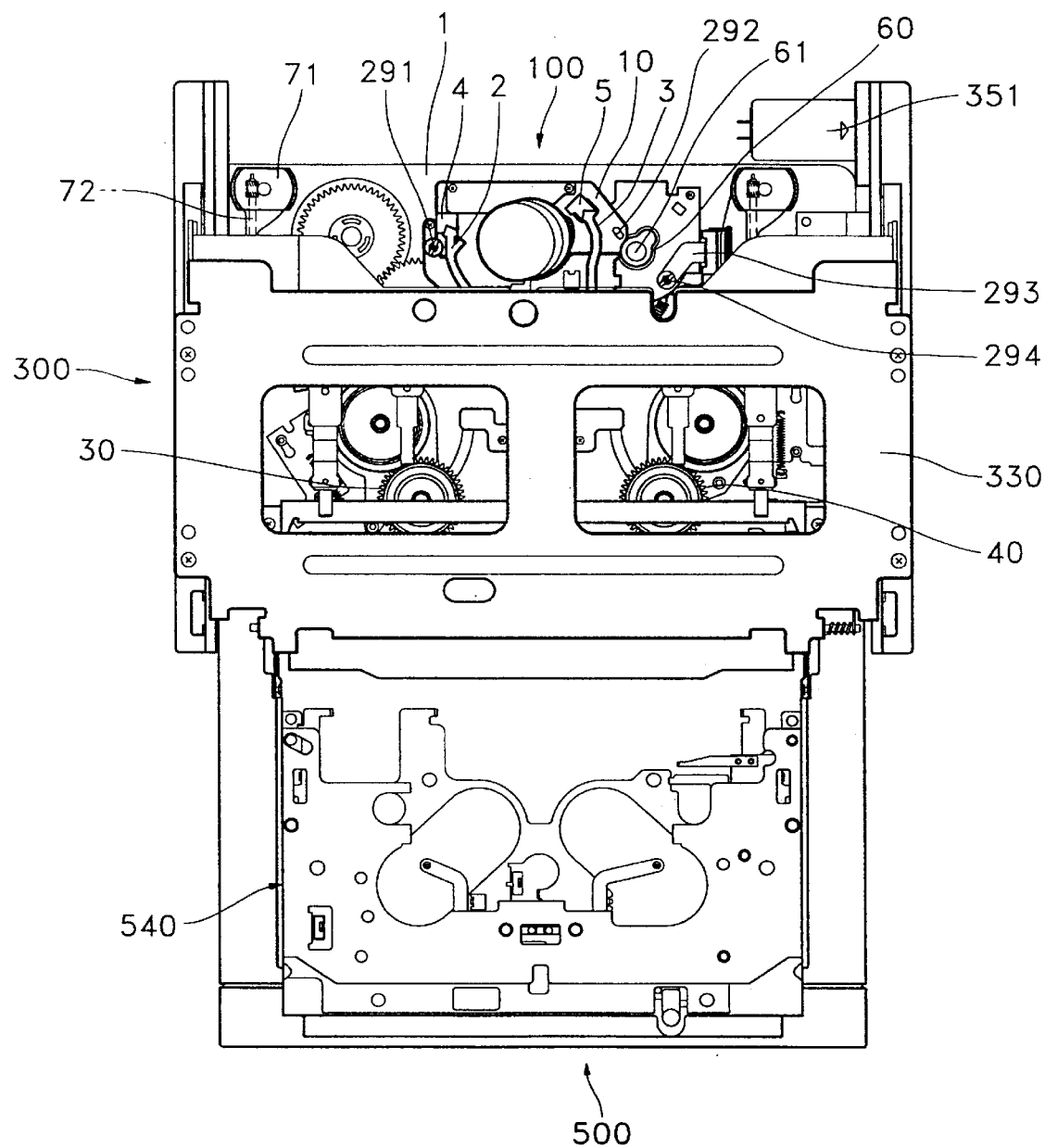

As shown in FIG. 1A, the tape guide means includes: a guide roller 291 and a fixing slant pole 292 which are erectly installed at both sides of the drum base 10, respectively; and a guide roller 294 fixed to the portion of the upper surface of the bracket 293, that is fixed to a predetermined portion of the supply part main chassis 1.

Additionally, the deck mechanism 100 includes tape cassette lid opening means for opening lids C11 and C21 when tape cassettes C10 and C20 are received.

Figure 30:
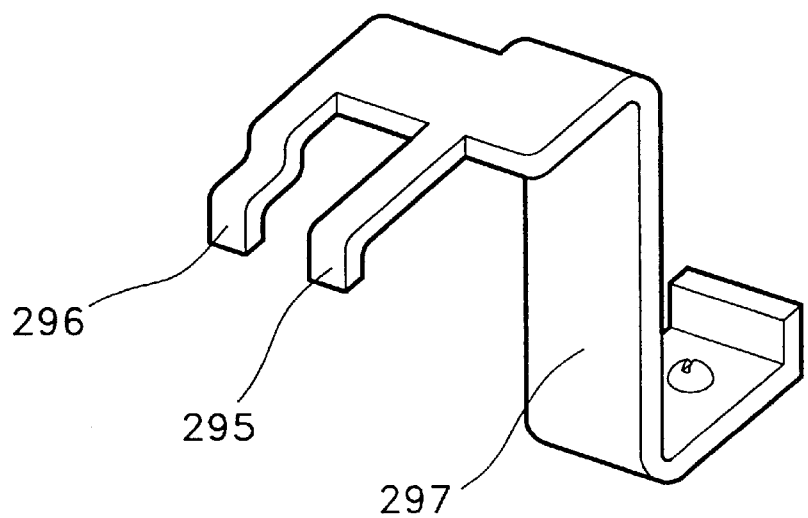
Figure 31:
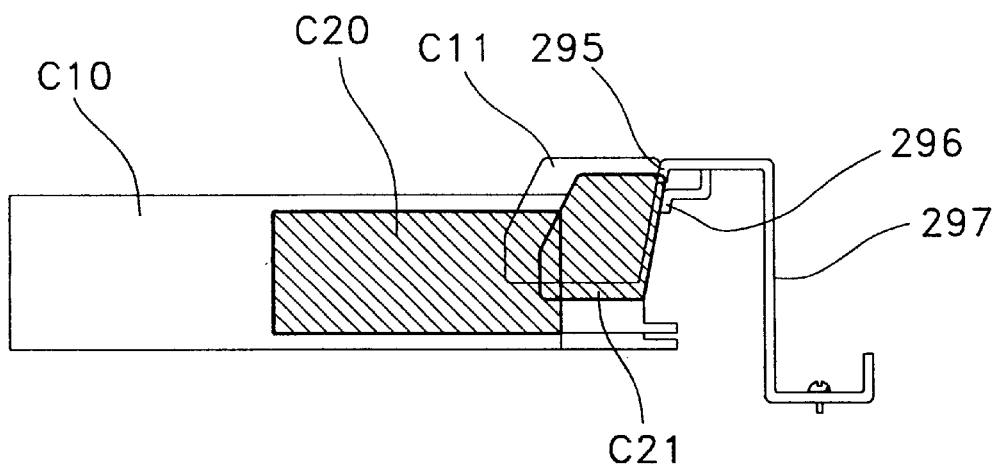
Figure 32:
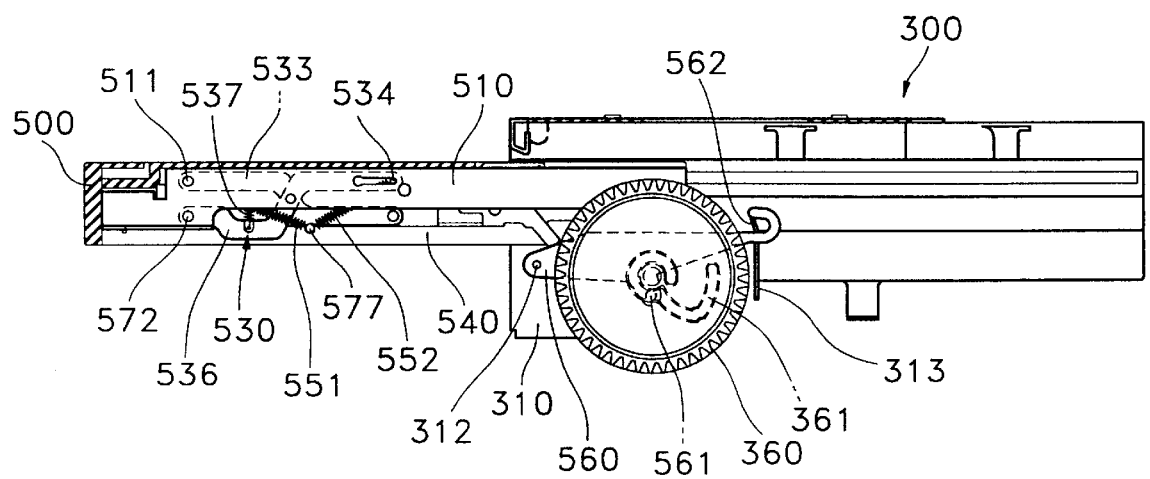
FIG. 32 is a fragmentary sectional side elevation view illustrating formation of a cassette holder receiving device comprising the tray loading type magnetic recording and reproducing apparatus of the present invention.
Figure 33:
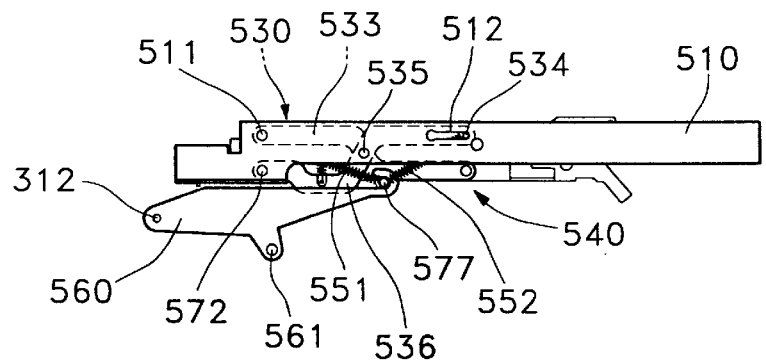
FIGS. 33 and 34 are side views illustrating formation and operation of the cassette holder receiving device as shown in FIG. 32.
Figure 34:
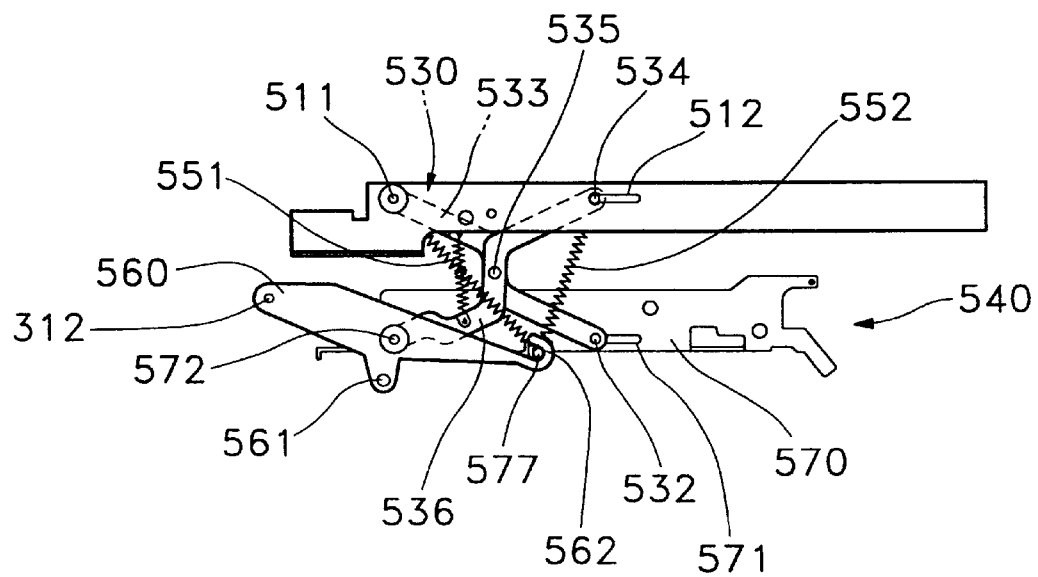
Figure 35:
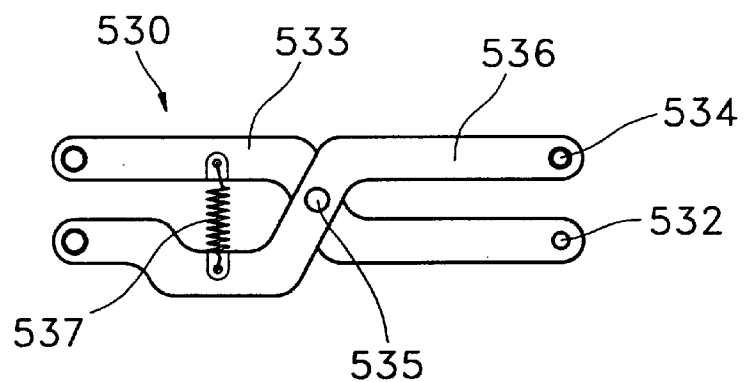
FIG. 35 is a side view of an X-shaped lever assembly of the cassette holder receiving device as shown in FIG. 32.

As shown in FIGS. 30 and 31, in the tape cassette lid opening means, a lid opener 297 that respectively forms the first and the second lid opening units 295 and 296 for respectively opening the lids C11 and C21 of the standard tape cassette C10 and the small tape cassette C20 as a single body, is fixed to a predetermined portion of the main chassis 1.

The numeral 298, not described in FIG. 1 shows a standard tape cassette release.

As shown in FIGS. 1 through 4, the cassette housing 300, which is covered and fixed at the portion of the upper surface of the deck mechanism 100, includes: side brackets 310 and 320, erectly installed at both sides of the main chassis 1; an upper plate 300 which is respectively fixed each peripheral side to the portion of the upper surface of the side bracket 310 and 320; and a front bracket 340 fixed to the lower end portion of the side brackets 310 and 320 with about ½ height of the side brackets 310 and 320.

The tray loading device includes: a tray loading motor 351 fixed to one side portion of the side bracket 310 of the cassette housing 300; cam gears 360 and 370 rotatably coupled with a predetermined portion of the side bracket 310, respectively, and respectively forming the first cam grooves 361 and 371 and the second cam grooves 362 and 372 at both side portions; power transmission means for transmitting the power of the tray loading motor 351 to the cam gears 360 and 370; and rectilinear movement guide means for rectilinearly moving the cassette tray 500 back and forth by the rotation of the cam gears 360 and 370.

The power transmission means includes: a driving pulley 381 and a driven gear pulley 382 rotatably coupled with both outer surfaces of the one side bracket 310; a belt 383 which connects the driving pulley 381 and the driven gear pulley 382; and a relaying gear 385 rotatably coupled within the cam gear 360 and the driven gear pulley 382 and interlocking with a cam gear 360 and a small gear 384 of the driven gear pulley 382.

The rectilinear movement guide means includes: inner rails 311 and 321 respectively fixed to an inner side of the side brackets 310 and 320; guide members 501 and 502 slidably fixed to the guide rails 311 and 321 by respectively being fixed to an outer side of the cassette tray 500; and racks 503 and 504 respectively fixed to both lower surfaces of the cassette tray 500 and interlocking with cam gears 360 and 370.

A synchronized shaft 341 is rotatably supported in the inner side of the front bracket 340 and synchronized gears 342 and 343 which interlock with cam gears 360 and 370 are fixed to both end portions of the synchronized shaft 341.

As shown in FIGS. 1B and 32 through 35, the cassette holder receiving device includes: fixing brackets 510 and 520 respectively fixed to both lower surfaces of the cassette tray 500 for closely adhering to racks 503 and 504; a cassette holder 540 connected to the fixing bracket 510 and 520 by an X-shaped lever assembly are equipped with the standard tape cassette C10 or the small tape cassette C20; the first and the second elastic members 551 and 552 for elastically supporting the cassette holder at the both sides; and a compressing lever 560, rotatably coupled with a predetermined portion of the inside of the side brackets 310 and 320 by a shaft pin 312, interlocked with cam gears 360 and 370 and descending the cassette holder 540, when the loading is finished.

The X-shaped assembly 530, the first and the second elastic members 551 and 552 and the compressing lever 560 among the aforementioned structural elements are formed as the same form in both sides of the cassette tray 500 and the side brackets 310 and 320, so, for easily understanding they are illustrated as one lateral structure.

Figure 36:
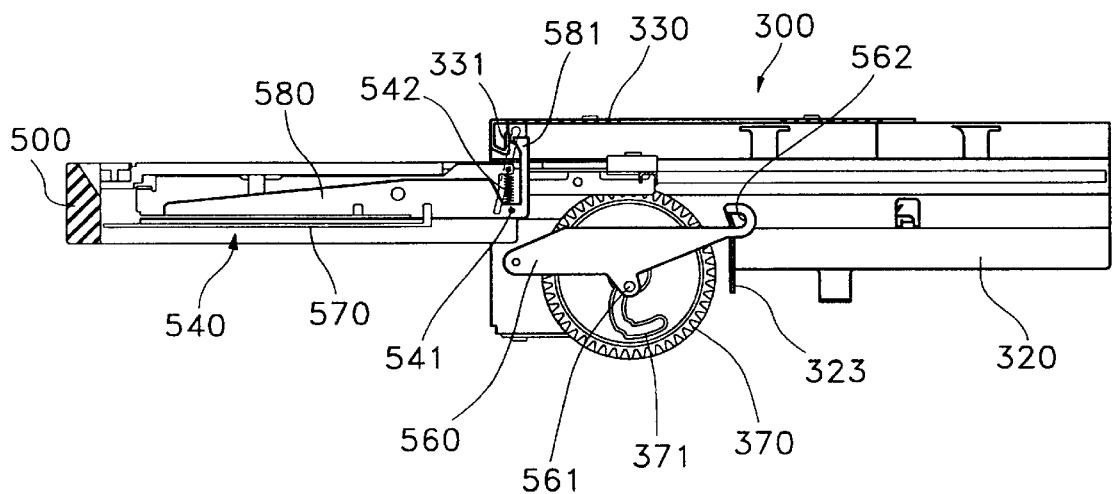
FIGS. 36 and 37 are fragmentary sectional views illustrating tape cassette receiving operation of a cassette holder, comprising the tray loading type magnetic recording and reproducing apparatus of the present invention.
Figure 37:
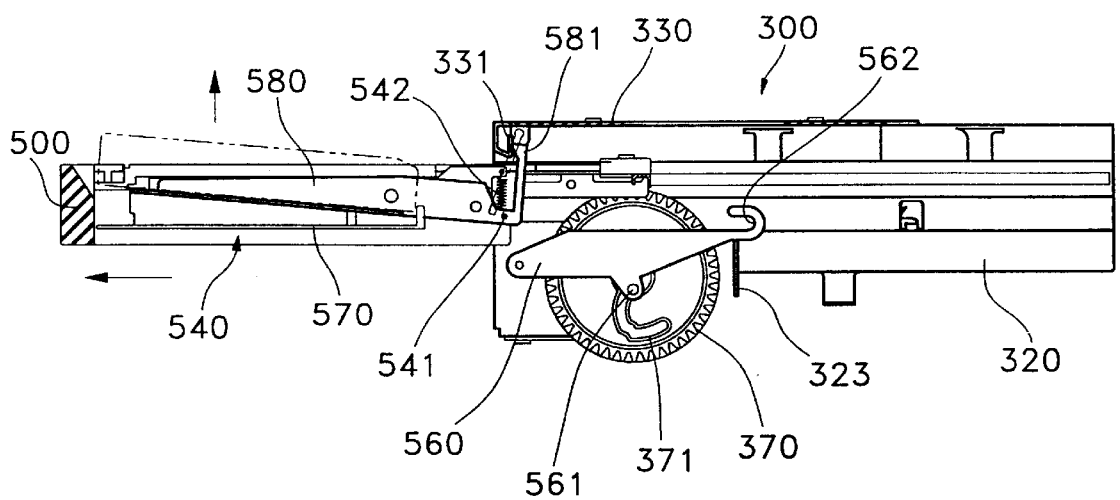
Figure 38:
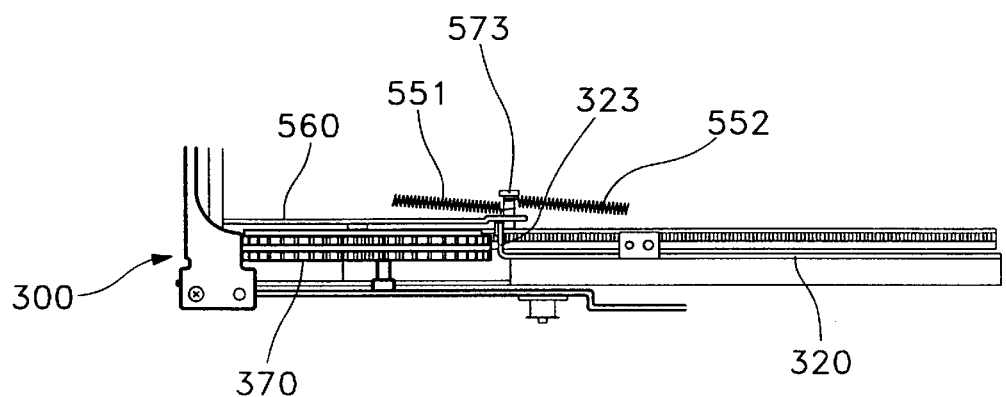
FIG. 38 is a bottom view illustrating formation of a guide rib as shown in FIGS. 36 and 37.

As shown in FIGS. 36 and 37, the cassette holder 540 includes a lower base 570 which is parted with an upper base 580 and an upper base 580. The upper base 580 is combined with the rear portion of the lower base 570 by a hinge pin 541 and when the cassette tray 500 is fully ejected, it can upward rotate to a predetermined angle.

Moreover, the rear portion of the upper and lower bases 580 and 570 are connected to an elastic member 542 such as a tension coil spring, so unless the cassette tray 500 is fully ejected, the upper base 580 adheres to the lower base 570 by the elasticity of the elastic member 542.

Moreover, a hooking part 581 is upward extended at the rear portion of the upper base 580 and a stopper 331 is formed at one end portion of an upper plate 330, which forms the cassette housing 300. So, when the hooking part 581 of the upper base 580 is hooked to the stopper 331 of the upper plate 330 in the point of finishing ejecting operation of the cassette tray 500, the upper base 580 overcomes the elasticity of the elastic member 542 and is upward rotatable about the hinge pin 541.

Figure 1B:
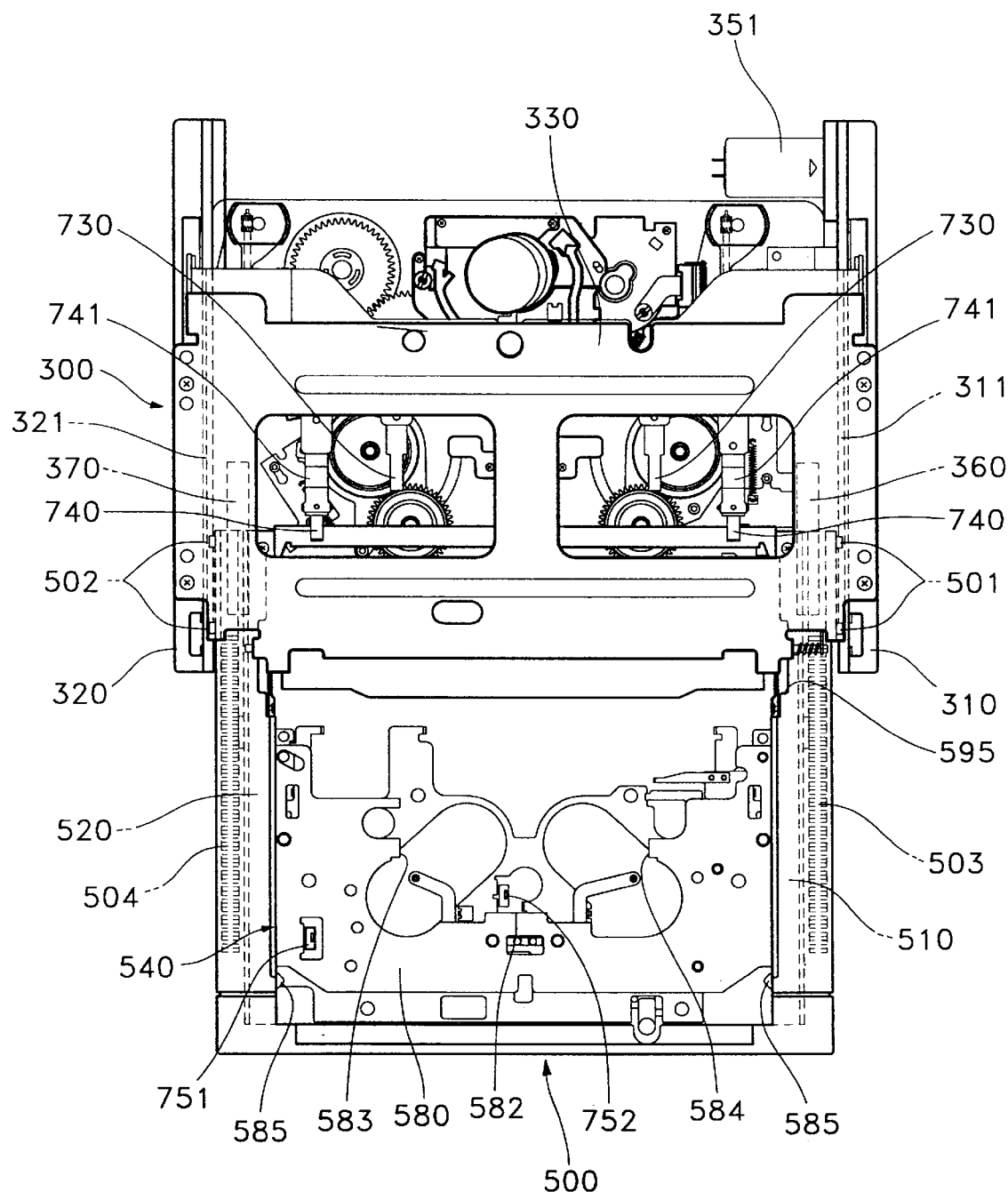
Figure 2:
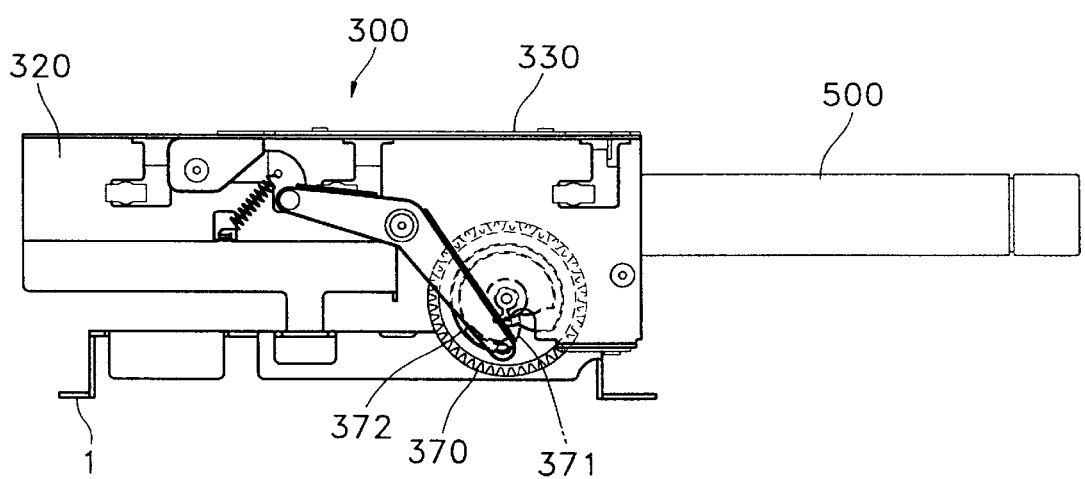
FIG. 2 is a left side view of FIG. 1.
Figure 3:
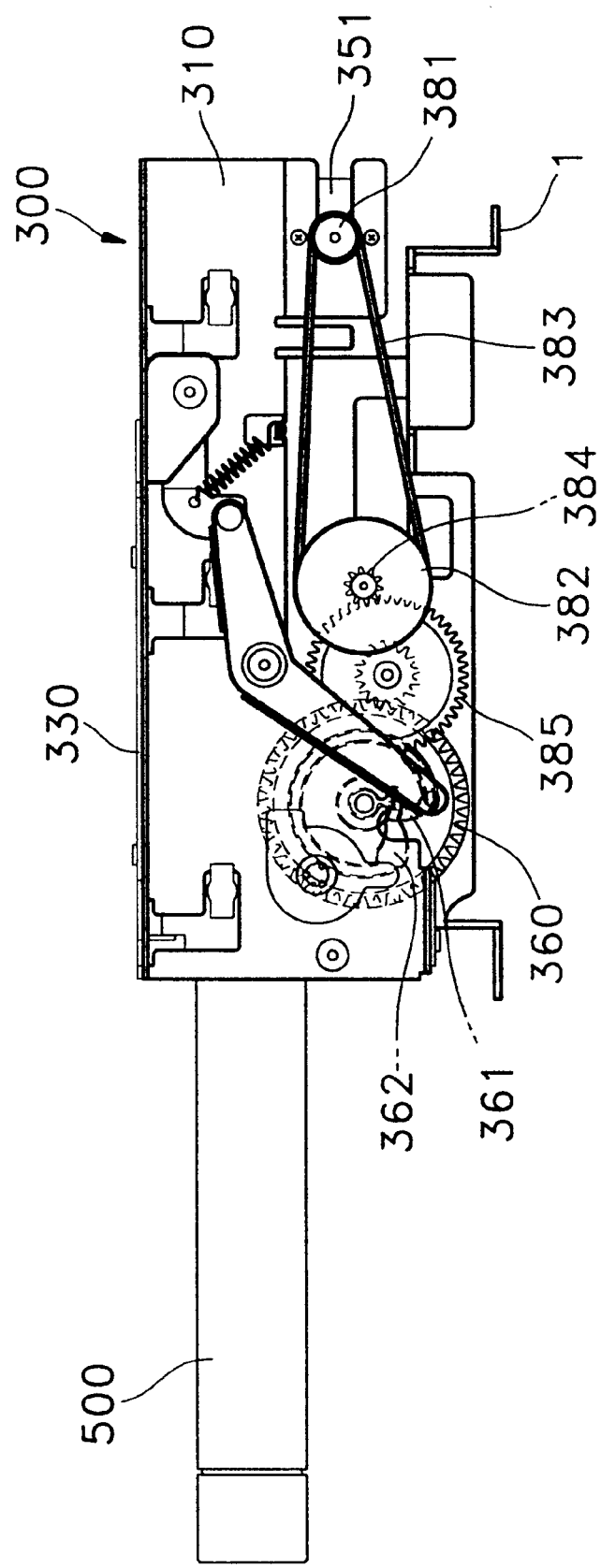
FIG. 3 is a right side view of FIG. 1.
Figure 4:
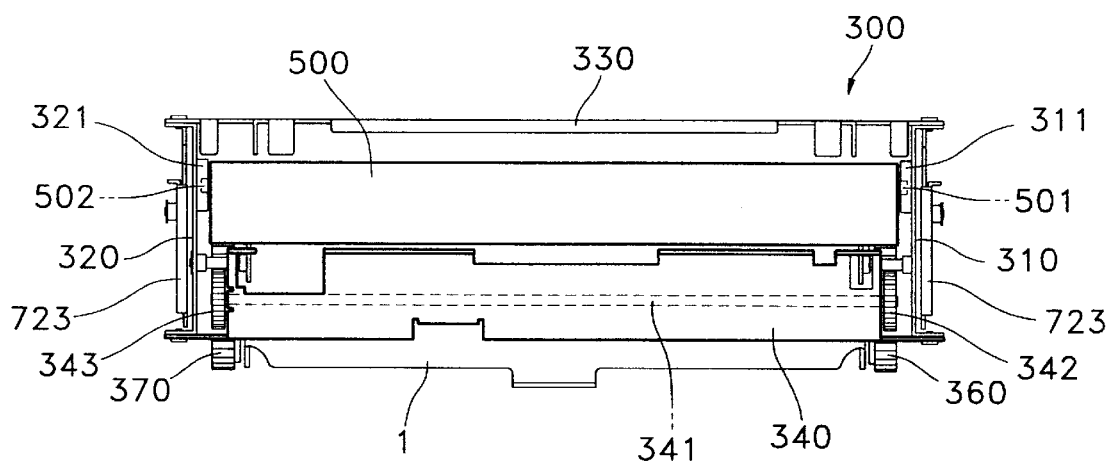
FIG. 4 is a front view of FIG. 1.
Figure 5:
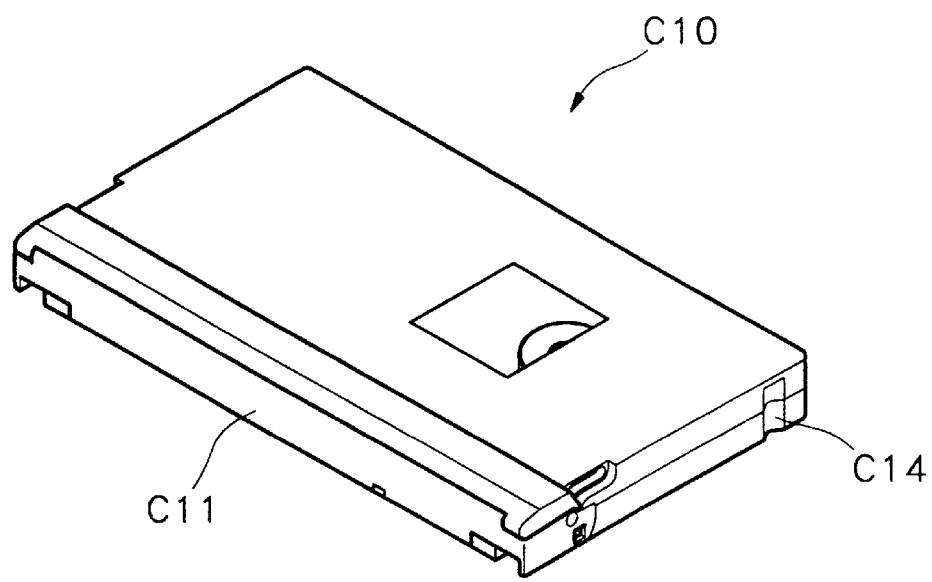
Figure 6:
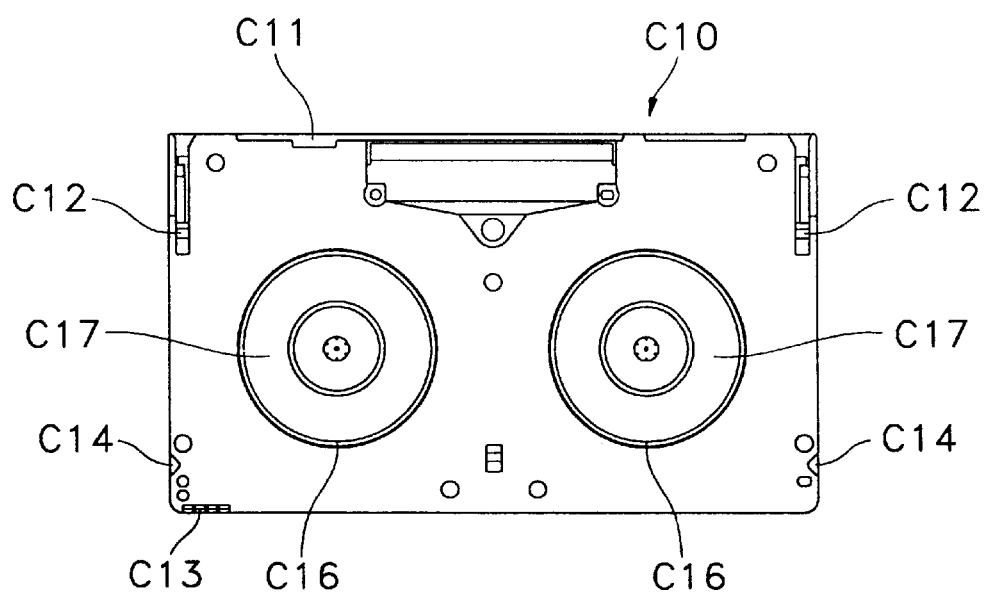
Figure 7:
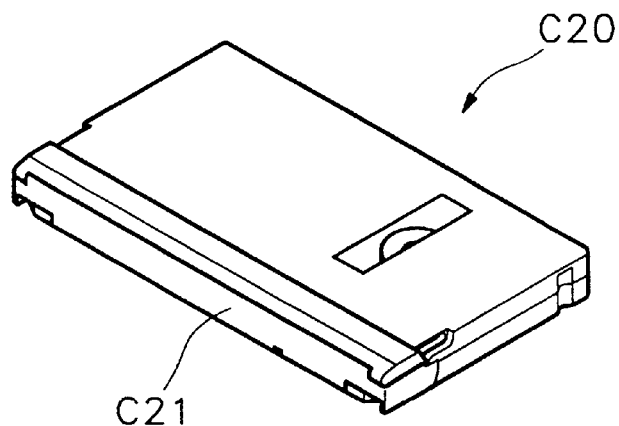
Figure 8:
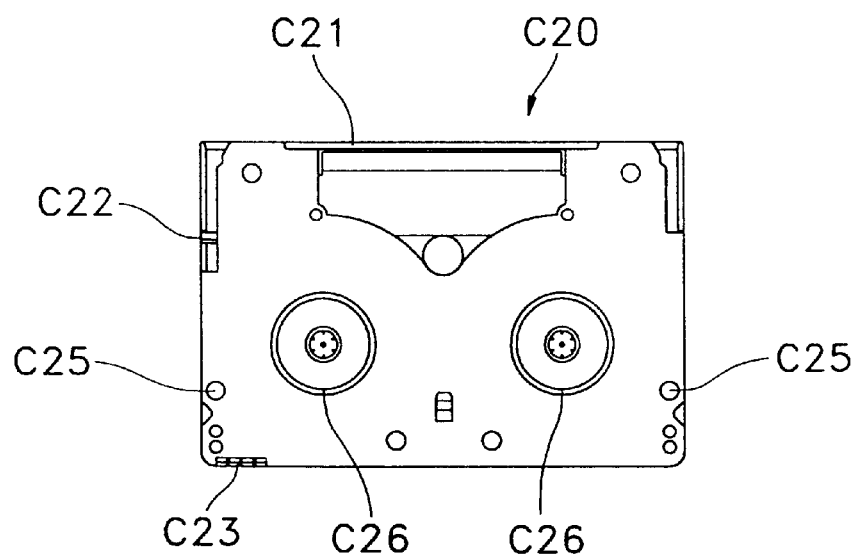
Figure 9:
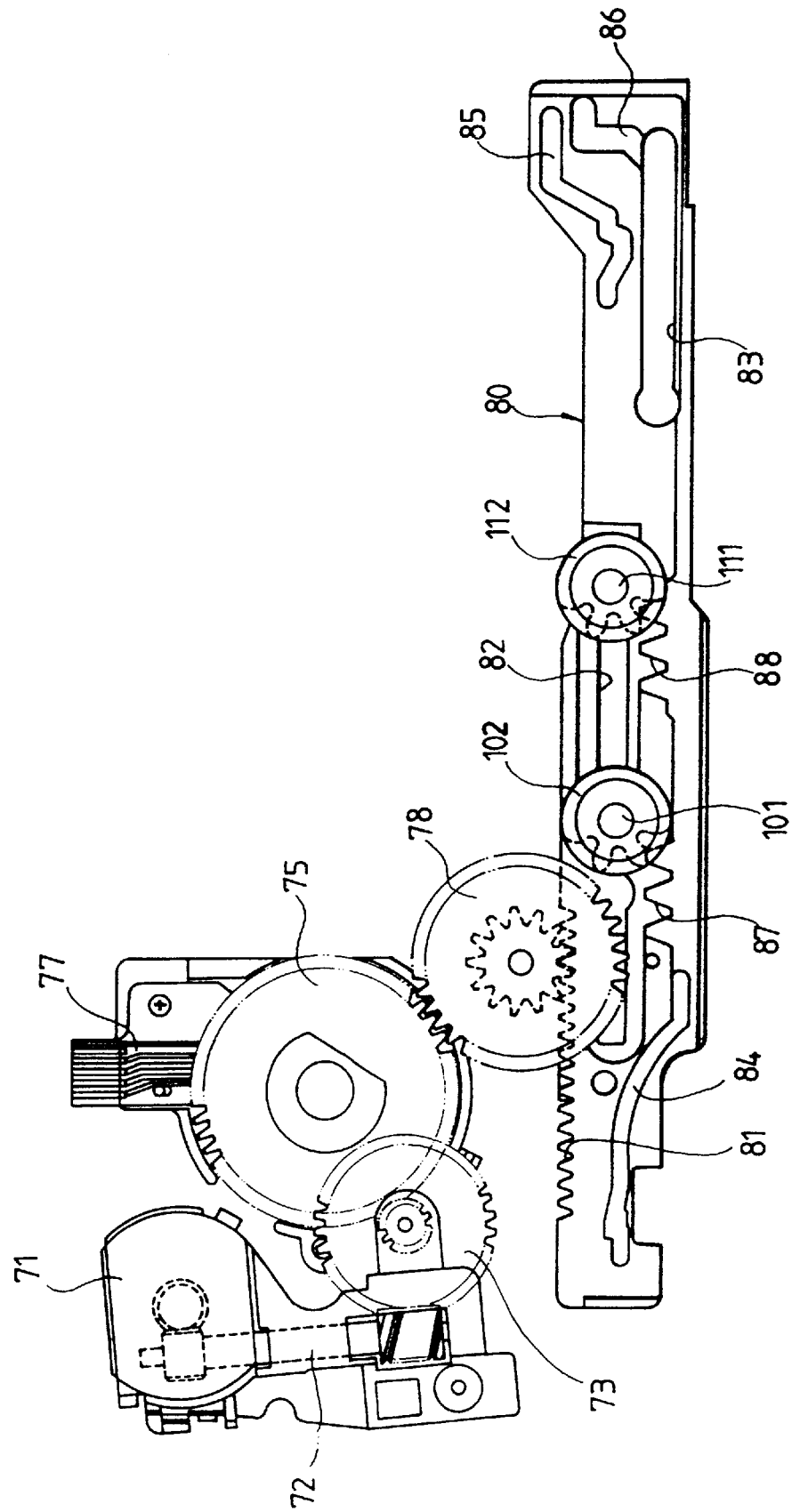
FIG. 9 is a plan view illustrating a principal part of the tape loading device comprising the tray loading type magnetic recording and reproducing apparatus of the present invention.

As shown in FIG. 1B, the upper base 580 forms a front supporting member 582 and both sides supporting units 583 and 584 for making it easy to receive the small tape cassette C20, wherein the front supporting unit 582 and both sides supporting units 583 and 584 are rounded to a predetermined curvature.

Moreover, mis-insertion preventing fragments 585 is respectively formed at the end portion of the inner surface of the upper base 580 for preventing mis-insertion of the standard tape cassette C10 by being fitted in loading grip C14, that is respectively formed both sides of the standard tape cassette C10. Accordingly, when inserting the standard tape cassette C10, the mis-insertion is prevented.

As shown in FIGS. 32 through 35, the X-shaped lever assembly 530 includes: the first rising and falling lever 533 rotatably combined with a fixing pin 511 of the fixing bracket 510 at one end portion and equipped with a guide pin 532 which is inserted to guide slot 571 which is formed at the side portion of the lower base 570 at another end portion; the second rising and falling lever 536 which is rotatably connected to a fixing pin 572, which is fixed to a side portion of the lower base 570 at one end portion of the side, equipped with a guide pin 534 which is inserted to a guide slot 512, formed at the side portion of the fixing bracket 510 at another end portion of the side and connected to the first rising and falling lever by a connecting pin 535 at the center portion of it; and an elastic member 537 such as a tension coil spring, elastically connecting the first and the second rising and falling levers 533 and 536.

The first and the second elastic members 551 and 552 such as tension coil springs are preferably used for elastically supporting the cassette holder 540. The upper portions of the first and the second elastic members 551 and 552 are respectively connected to the fixing pin 511 of the fixing bracket 510 and the guide pin 534 of the second rising and falling lever 536, and the lower portion of the first and the second elastic members 551 and 552 are respectively connected to an operating pin 577, that is respectively fixed to both center portions of the lower surface of the lower base 570.

A cam pin 561 which is inserted to the first cam grooves 361 and 371 of the cam gears 360 and 370 is respectively fixed to the one portion of the outer surface of the compressing lever 560 and a hooking groove 562 which hooks the operating pin 577 of the cassette holder 540 is respectively formed in the end portion of the inside of the compressing lever 560.

Moreover, as shown in FIGS. 32 and 36 through 38, by folded forming guide ribs 313 and 323 at the predetermined portion of the inside of the side brackets 310 and 320 for supporting an outer side of the compressing lever 560, if there have been abrasion and looseness of the cam gears 360 and 370 and the racks 503 and 504, when loading the cassette tray 500, the operating pin 577 of the cassette holder 540 is exactly fitted in the hooking groove 562 of the compressing lever 560.

Figure 39:
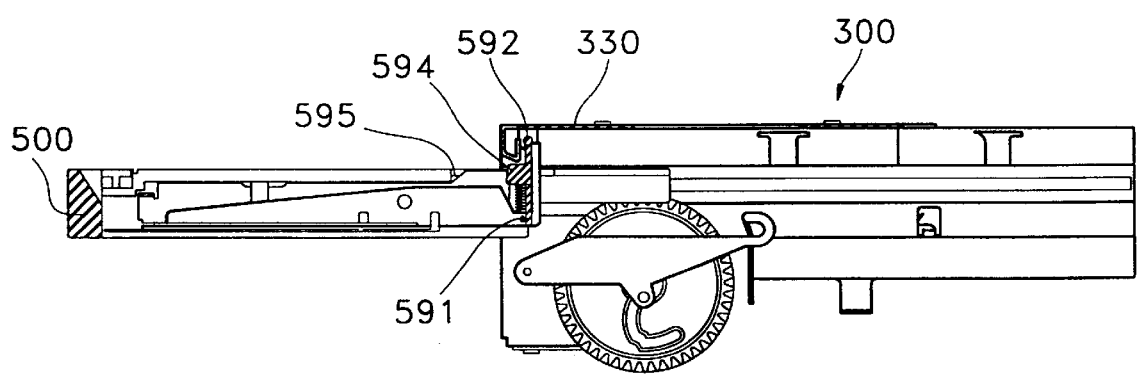
Figure 40:
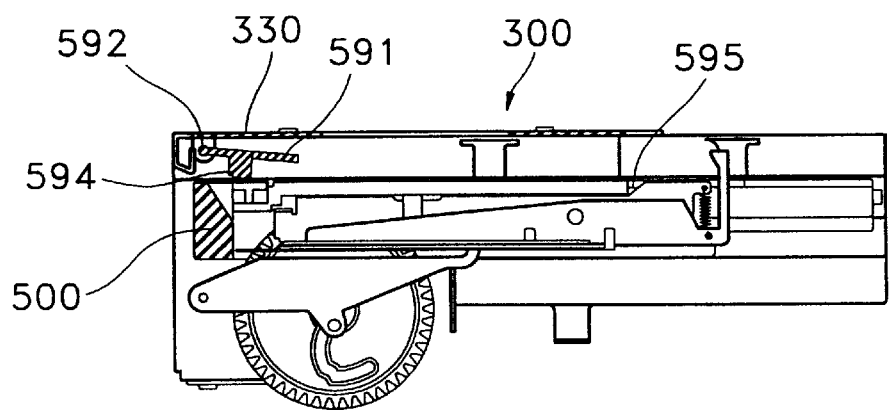
Figure 41:
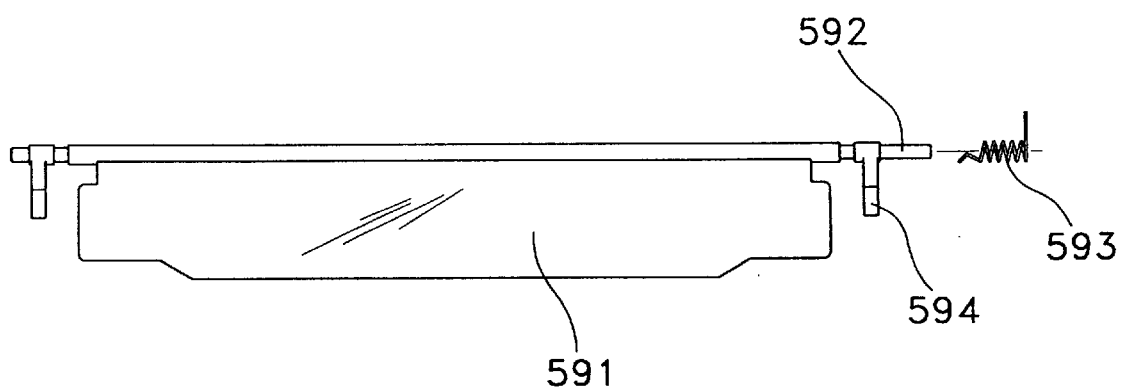
Figure 42:
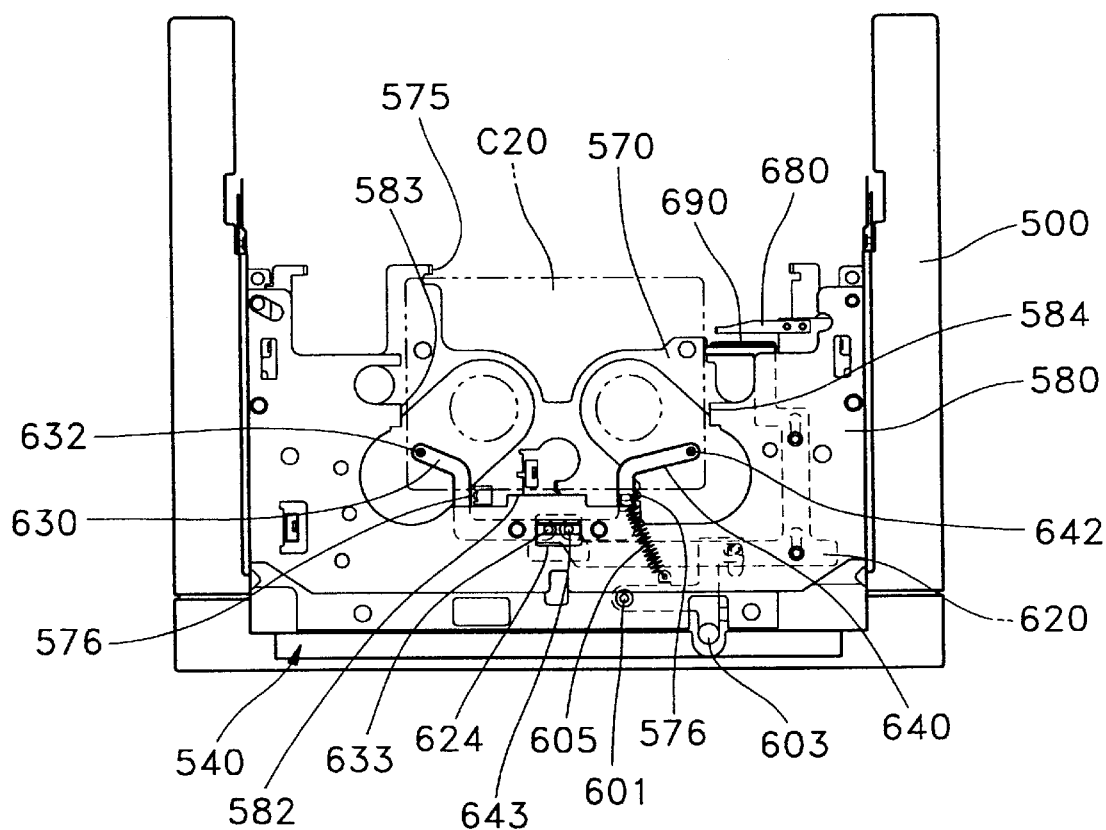

Moreover, as shown in FIGS. 39 through 41, when the cassette tray 500 ejects a cassette, the mid door closes by the elasticity of the elastic member 593 by rotatably combining a mid door at the front end portion of the upper plate 330 for displaying good appearances and preventing influx of a foreign material by covering inside of the cassette tray 500 and by connecting an elastic member such as a torsion coil spring at one rotating shaft 592 of the mid door. When the cassette tray 500 unloads a cassette, the long hooking protrusion 595 pushes the small hooking protrusion 594 and opens the mid door 591 by forming a short hooking protrusion 594 downward at one periphery portion of the mid door 591 and forming a long hooking protrusion 595 at one predetermined portion of the cassette tray 500 (as shown in FIG. 1B).

The short hooking protrusion 594 additionally supports one side portion of the elastic member 593.

Moreover, the cassette holder 540 additionally includes: tape cassette receiving means for receiving the small tape cassette C20 when the small tape cassette C20 is received and preventing interference with other elements installed for receiving the small tape cassette C20 when the standard tape cassette C10 is received; and lid locking releasing means for releasing lid locking of the standard and the small tape cassettes C10 and C20.

As shown in FIGS. 42 through 47, the tape cassette receiving means includes: a lower lever 610, rotatably combined with the center portion of the lower end of the lower base 570 and forming a pin inserting groove 602 at the one side portion; a detect boss 604, upward fixed to the lower lever 610 at the one side portion of the upper surface of the lower lever 610 and forming a slope surface 603, which is guided by the standard tape cassette C10; an elastic member 605 such as a tension coil spring, connectedly fixed to the lower lever 610 and elastically supporting the lower lever 610; a guide lever 620, located between the upper base 580 and the lower base 570 and moved by the rotation of the lower lever 610; and supporting levers 630 and 640, rotatably installed at both center portions of the lower base 570 by the shaft pins 631 and 641, respectively, respectively forming supporting pins 632 and 642, which are inserted to a supporting groove C25, wherein the supporting groove C25 is formed at the lower portion of the small tape cassette C20, at the end portion, and rotating according to the movement of the guide lever 620.

The guide lever 620 fixes a guide pin 621 which is inserted to a pin inserting groove 602 of the lower lever 610 at one portion of the lower surface forms guide slots 622 and 623 which are inserted to the respectively fixed guide pins 573 and 574 at both front and rear sides of the lower base 570 and can be rectilinearly moved back and forth with guidance of the guide slots 622 and 623 by the rotation of the lower lever 610.

A hooking slot 624, having a predetermined size, is formed at the one side portion of the guide lever 620 and hooking pins 633 and 634, which are inserted to the hooking slot 624 of the guide lever 620, are respectively formed at the one side portion of the supporting levers 630 and 640. When loading the standard tape cassette C10, supporting levers 630 and 640 rotate about the shaft pins 631 and 641 by rotation of the lower lever 610 and rectilinear movement of the guide lever 620. Supporting pins 632 and 642 of the supporting levers 630 and 640 are located in each escaping groove C17 and C17, which are formed in each hub C16 and C16 of the standard tape cassette C10.

Moreover, the small tape cassette C20 is easily received by forming a hooking protrusion 575 for supporting the rear portion of the small tape cassette C20 at the rear end portion of the lower base 570 and respectively forming guide protrusions 576 and 576 for supporting the front portion of the small tape cassette C20 at both portions of the center side of the lower base 570.

The lid locking releasing means includes: a lock releasing fragment 650, respectively forming lock releasing protrusion 651, which is combined with both rear portions of the cassette holder 540 with rectilinearly moving back and forth, and contacting to both lid locking units C18 and C18 of the standard tape cassette at the front portion; an elastic member 660 such as a tension coil spring, connected and fixed to the lock releasing fragment 650 for elastically supporting the lock releasing fragment 650 in one direction; and a stopper bracket 670, which is respectively erected and fixed to both rear side portions of the main chassis 1 and has the lock releasing protrusion 651, which moves the lid locking unit C18 of the standard tape cassette C10, by moving the lock releasing fragment 650 when the loading of the cassette tray 500 is finished.

The lock releasing fragments 650 is located between the upper base 580 and the lower base 570 of the cassette holder 540 and folded for having a horizontal unit 652 and a perpendicular unit 653.

The horizontal unit 652 of the lock releasing fragment 650 is respectively forming guide slots 654 and 655 for inserting a front and a rear guide pins 586 and 587 of the upper base 580 at both front and rear sides, forming the lock releasing protrusion 651 at the center portion of the front and respectively forming the operating protrusion 656, which is hooked to the stopper bracket 670 at the one portion of the outside.

The lock releasing fragment 650, the elastic member 660 and the stopper brackets 670 among the aforementioned structural elements are formed as the same form in both sides of the cassette holder 540, so, for easily understanding they are illustrated as one lateral structure.

Meanwhile, a lid locking releasing means of the small tape cassette is equipped at the rear right portion of the cassette holder 540 because a lid locking unit C28 of the small tape cassette C20 is equipped at one (right) side portion.

The lid locking releasing means of the small tape cassette is preferably formed at one locking releasing fragment 650, that forms lid locking releasing means of the standard tape cassette C10 as a single body, as aforementioned and described detailed.

Moreover, the lock releasing fragment 650 forms a lid lock releasing member 680 at the inner periphery and the lid lock releasing member 680 has a predetermined length and folded forming the lock releasing protrusion 681 at the end portion of the inside.

The lower portion of the lid lock releasing member 680 has a propping part 690 for reinforcing the rigidity of the lid lock releasing member 680 when the lock releasing protrusion 681 of the lid lock releasing member 680 contacts the lid lock part C28 of the small tape cassette C20.

The propping part 690 is preferably formed at a predetermined portion of the guide lever 620 which forms the lid locking releasing means of the standard tape cassette C10 as a single body.

Moreover, one side of the side bracket 320 of the cassette housing 300 equips with motion detecting means for detecting the motion of the cassette holder 540.

Figure 49:
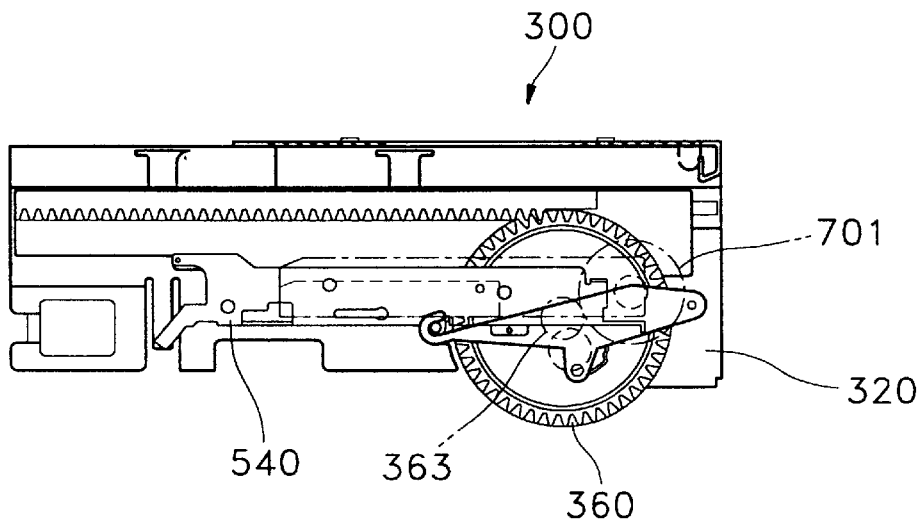
Figure 50:
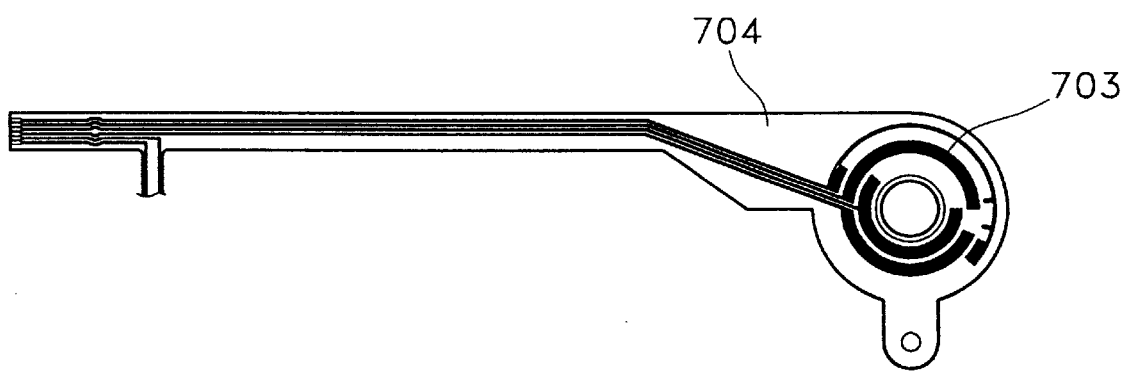
Figure 51:
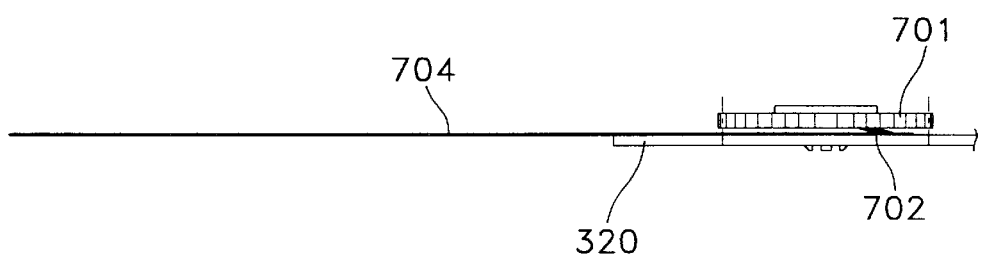
Figure 52:
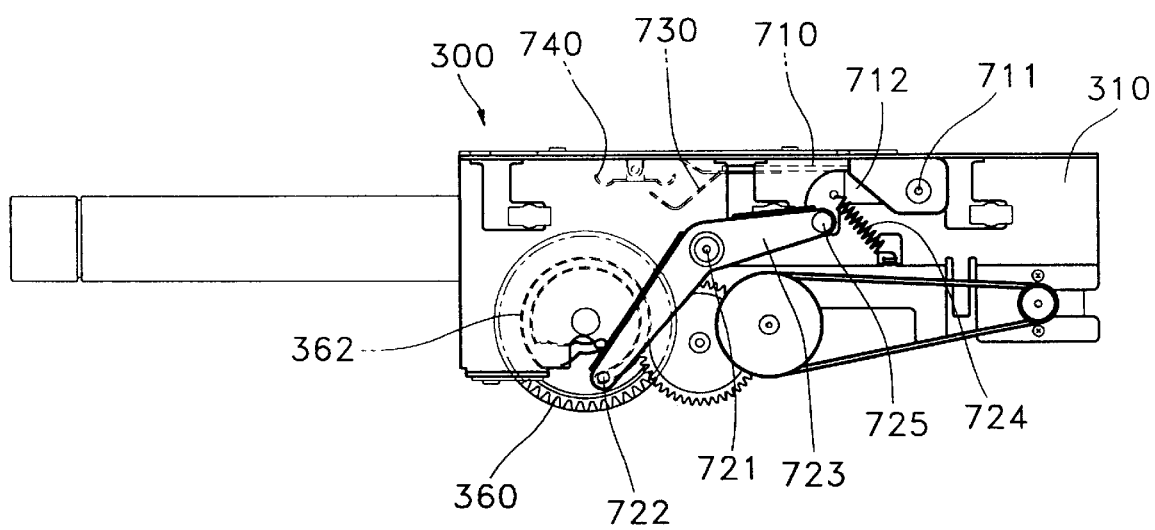
Figure 53:
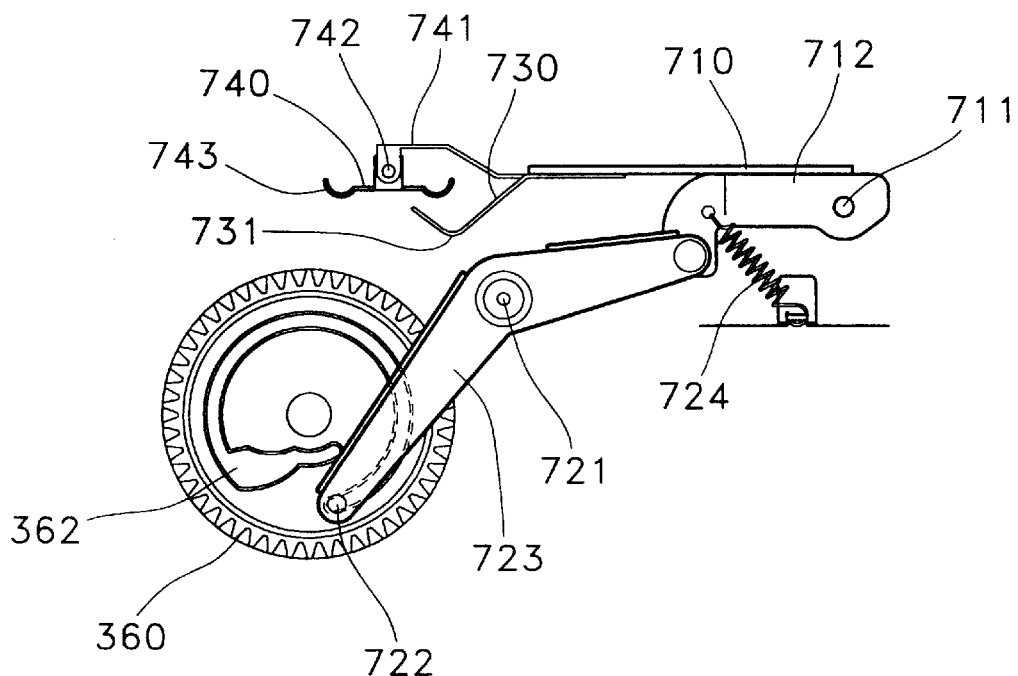
Figure 54:
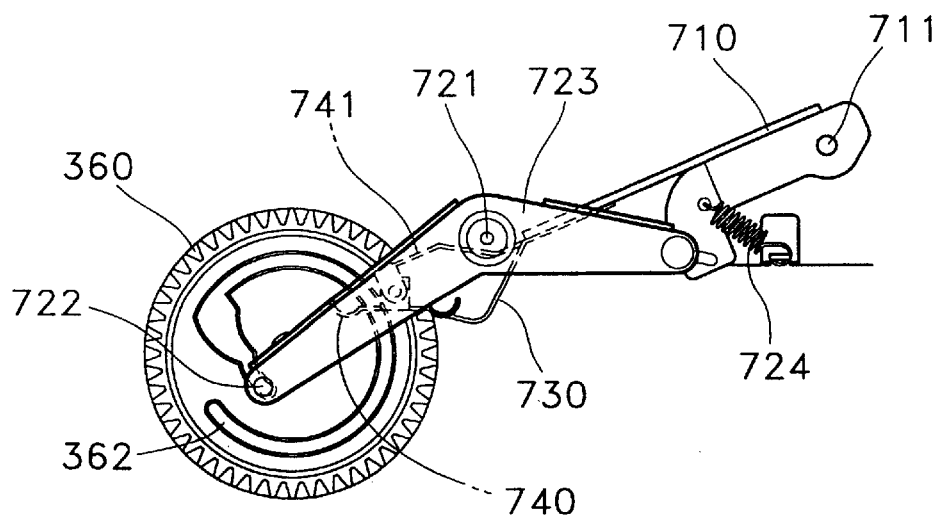

As shown in FIGS. 49 through 51, the motion detecting means executes automatically detecting the motions of the cassette holder 540 which receives the standard tape cassette C10 or the small tape cassette C20 and includes: a switch gear 701 rotatably combined with a predetermined portion of the inside of the one side of the side bracket 310 and interlocking with a small gear 363 of the cam gear 360; a plurality of elastic brushes 702 attached to the inside portion of the program switch gear 701; and an FPC 704 which is fixed at the inner side of the side bracket 310 to which the side bracket 310 is corresponding the program switch gear 701 and having a plurality of patterns for contacting the elastic brush 702.

The elastic brush 702 has the same form compare to the elastic brush 74 which is attached and fixed to the program switch 75 of the aforementioned deck mechanism 100.

Meanwhile, the cassette holder receiving device additionally includes tape cassette compressing means for supporting the standard and the small tape cassettes C10 and C20.

As shown in FIGS. 1B and 52 through 54, the tape cassette compressing means includes: a compressing plate 710 combined with both rear sides of the side brackets 310 and 320 of the cassette housing 300 by a shaft pin 711 and rotating to a predetermined angle at the lower portion of the upper plate 330; the first compressing means which is respectively formed at both front portions of the center side of the compressing plate 710 and elastically supporting the standard and the small tape cassette C10 and C20; the second compressing means which is respectively formed at both front peripheries of the compressing plate 710 and elastically supporting the standard tape cassette C10; and compressing driving means for providing the rotatory power to the compressing plate 710.

The compressing driving means includes: an operating lever 723 rotatably combined with the central outer periphery of the side brackets 310 and 320 and fixing a cam pin 722 which is inserted to the second cam grooves 362 and 372 of the cam gear 360 and 370 at one end portion of the side; and elastic member 724 such as a tension coil spring, connected and fixed to a connecting fragment 714 of the compressing plate 710 which is exposed to an outer side of the side brackets 310 and 320 and elastically supporting the compressing plate 710.

Another end portion of the side of the operating lever 723 and the connecting fragment 712 of the compressing plate 710 are connected by a connecting pin 725, so the compressing plate 710 is rotated by the rotation of the operating lever 723.

The first compressing means includes the first compressing member 730 which is respectively fixed to both front portions of the center side of the compressing plate 710 and forming an elastic compressing unit 731. The second compressing means includes: a fixing fragment 741 respectively fixed at both front side peripheries of the compressing plate 710; and the second compressing member 740 rotatably combined with the fixing fragment 741 by a connecting pin 742 and respectively forming the elastic compressing unit 743 at both lower surfaces.

The compressing driving means is formed as the same form in the side brackets 310 and 320, so for easily understanding they are illustrated as one lateral structure.

The numerals 751 and 752, not described in the drawings, are respectively showing a standard tape cassette sensing switch for sensing the reception of the standard tape cassette C10 and a small tape sensing switch for sensing the reception of the small tape cassette C20.

The operation of the tray loading type magnetic recording and reproducing apparatus formed as the aforementioned manner will be described hereinafter.

First, when a user pushes an eject button (not described here) for using the standard tape cassette C10 or the small tape cassette C20 and the cassette tray 500 is received in the cassette housing 300 and electric signals which are transmitted to the tray loading motor 351 drive the tray loading motor 351.

The power of the tray loading motor 351 is transmitted to the cam gear 360 through the driving pulley 381, the belt 383, the driven gear pulley 382, the relaying gear 385 and the cam gear 360 and finally rotates the cam gear 360. The cassette tray 500 is forward ejected by respectively interlocking both racks 503 and 504 of the cassette tray 500 with the one cam gear 360 and another cam gear 370.

At this time, the guide members 501 and 502 respectively fixed to both sides of the cassette tray 500 are respectively inserted to the guide rails 311 and 321 which are fixed to both side brackets 310 and 320 of the cassette housing 300 and also, both synchronized gears 342 and 343 of the synchronized shaft 341 which is supported on the front bracket 340 are interlocked with the cam gears 360 and 370, so the ejecting movement of the cassette tray 500 is harmoniously and softly executed.

As aforementioned, as the ejecting movement of the cassette tray 500 is finished, the hooking part 581 which is formed at the rear end portion of the upper base 580 which is forming the cassette holder 540 is hooked to the stopper 331 of the upper plate 330, so the upper base 580 overcomes the elasticity of the elastic member 542 and rotates in a clockwise direction (with referring to FIG. 37) about the hinge pin 541.

Accordingly, the receiving of the standard tape cassette C10 or the small tape cassette C20 is easily executed by upward raising of the end portion of the upper base 580. So, the receiving movement of the small tape cassettes C20 will be described hereafter.

As shown in FIGS. 37 through 42, when the small tape cassette C20 is received if the upper base 580 of the cassette holder 540 is raised, the front portion of the small tape cassette C20 is guided to the front supporting unit 582 of the upper base 580, both sides are supported by both side supporting units 583 and 584 of the upper base 580 and simultaneously, supported by the rear-sided hooking protrusion 575 of the lower base 570 and guide protrusions 576 and 576 of both front sides, and supporting grooves C25 and C25 (shown in FIG. 8) which are formed both lower surfaces of the small tape cassette C20 are combined by the supporting pins 632 and 642 of the supporting levers 630 and 640 and finally, receiving of the small tape cassette C20 is accomplished.

At this time, the front supporting unit 582 and both side supporting units 583 and 584 are rounded to a predetermined curvature for making it easy to receive the small tape cassette C20.

When a user uses a standard tape cassette C10, the supporting pins 632 and 642 for supporting the small tape cassette C20 are located at the upright portion of the supply and take up reels 30 and 40 of the deck mechanism 100. So, for preventing interference, they may be moved to the other position.

Figure 43:
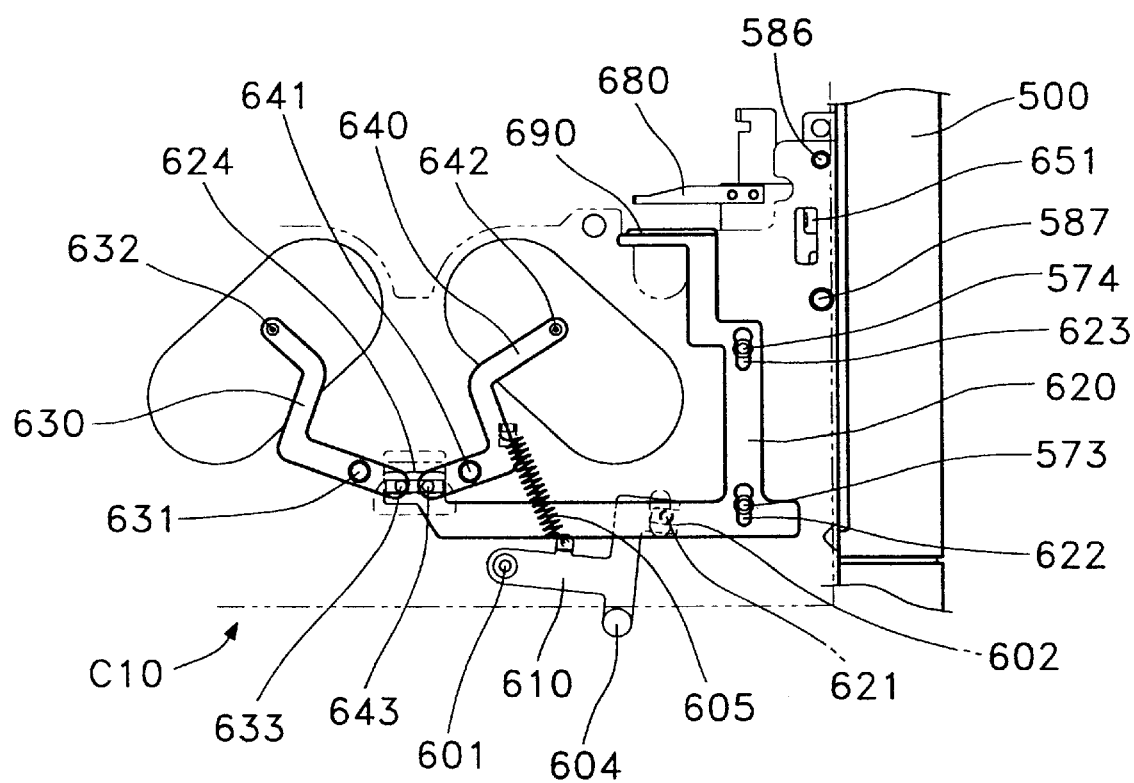
Figure 44:
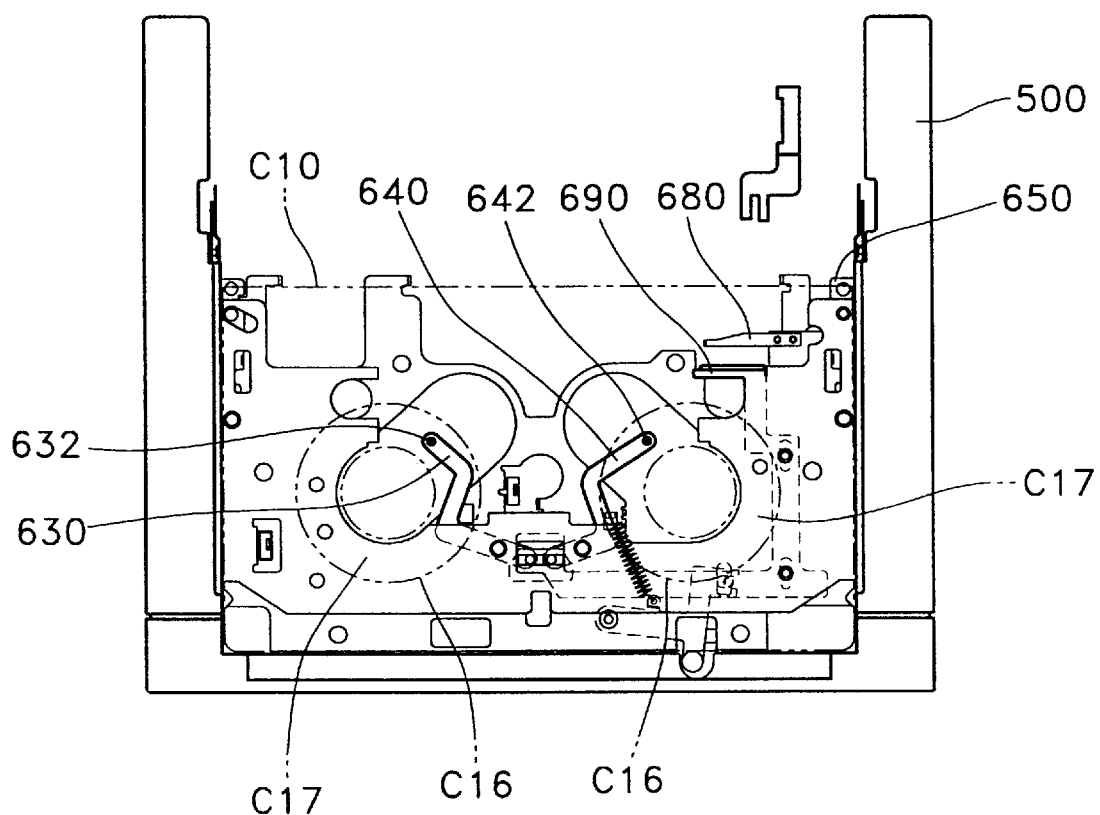
Figure 45:
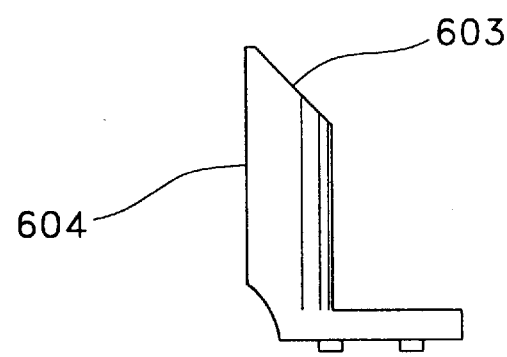
Figure 46A:
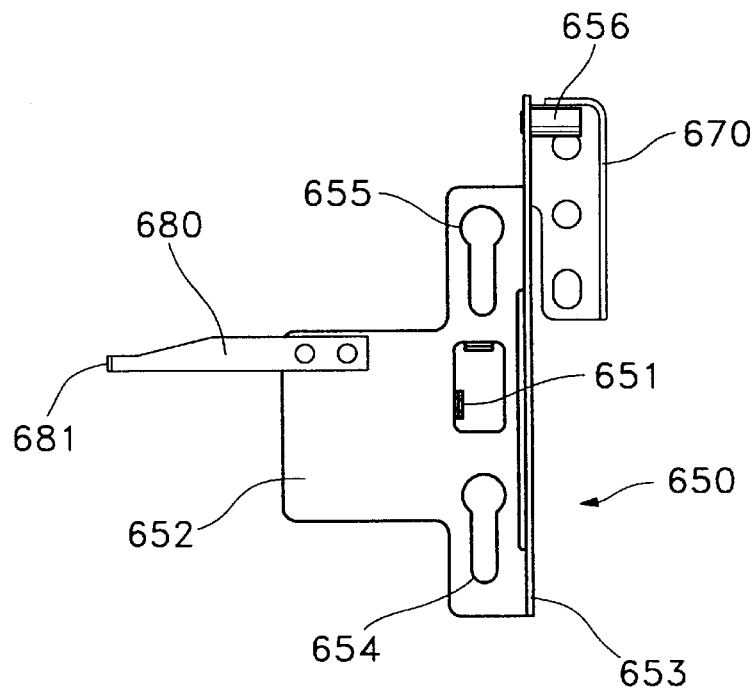
FIGS. 46a and 46b are a plan view and a side view of a lock releasing fragment for releasing lock of a standard and a small tape cassettes, respectively.
Figure 46B:
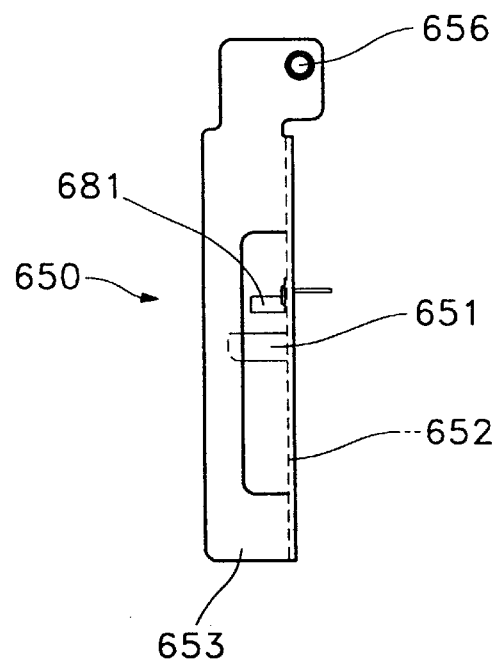
Figure 47:
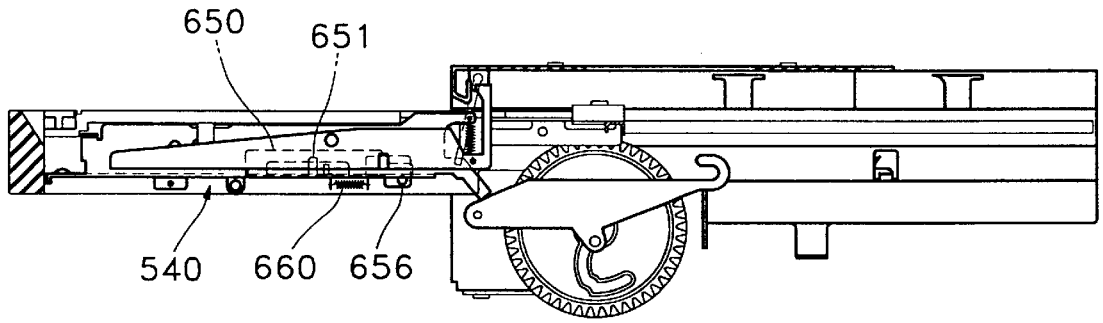
Figure 48:
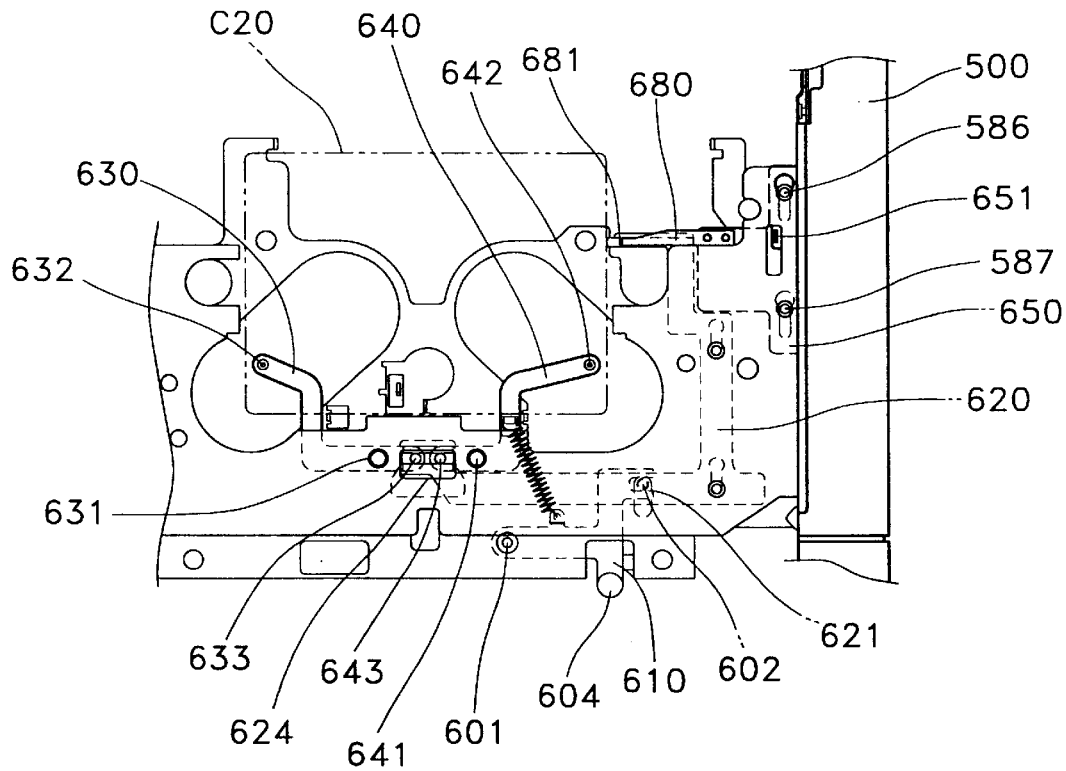

Moreover, as shown in FIGS. 43 and 44, when a standard tape cassette C10 is received to the cassette holder 540 of the cassette tray 500, the end portion of the standard tape cassette C10 is loaded on the slope surface 603 of the detect boss 604, the lower lever 610 which is formed with the detect boss 604 as a single body overcomes the elasticity of the elastic member 605 and rotates in a clockwise direction about the shaft pin 601 and the guide lever 620 moves forward with guidance of the guide pins 573 and 574 which are formed in the lower base 570 by the rotation of the lower lever 610.

At this time, the supporting levers 630 and 640 are respectively rotated to the inward direction about the shaft pins 631 and 641, because the hooking pins 633 and 643 of the supporting levers 630 and 640 are respectively inserted to the hooking slot 624 which is formed at one end portion of the guide lever 620. Accordingly, the supporting pins 632 and 642 of the supporting lever 630 and 640 are respectively located at the escaping grooves C17 and C17 which are formed both hubs C16 and C16 of the standard tape cassette C10, so the interference between the supporting levers 630 and 640 and other elements are prevented.

In receiving the standard tape cassette C10 in the cassette holder 540, with respectively forming the mis-insertion preventing fragment 585 in both side end portions of the upper surface of the lower base 570, when the standard tape cassette C10 is normally inserted to the cassette holder 540 the loading grips C14 and C14 which are formed both sides of the standard tape cassette C10 are guided with guidance of the mis-insertion preventing fragment 585 and the standard tape cassette C10 is received to the cassette holder 540. But, when the standard tape cassette is inside-outed or reversely inserted to the cassette holder 540, the standard tape cassette C10 is hooked to the mis-insertion preventing fragment 585 and cannot be received to the cassette holder 540.

Meanwhile, when the cassette tray 500 is fully ejected, the inside of the cassette housing 300 is covered by rotatably connecting a mid door 591 at the end portion of the cassette housing 300. The opening and closing movement of the mid-door 591 according to the ejecting movement of the cassette tray 500 will be described hereinafter.

As shown in FIG. 40, when the cassette tray 500 is received in the cassette housing 300, the mid door 591 which overcomes the elasticity of the elastic member 593 and rotates in a counterclockwise direction maintains openness.

In other words, the long hooking protrusion 595 of the cassette tray 500 pushes the short hooking protrusion 594 of the mid door 591 and opens the mid door 591.

In this state, according to the above-mentioned ejecting movement of the cassette tray 500, when the long hooking protrusion 595 of the cassette tray 500 is deviated from the short hooking protrusion of the mid door 591, the mid door 591 is release from the restriction of the cassette tray 500. Accordingly as shown in FIG. 39, when the cassette tray 500 is fully ejected, the mid door 591 rotates in a clockwise direction by the restoring force of the elastic member 593 and closes the entrance of the cassette housing 300.

Like this, if the cassette tray 500 is fully ejected, when a child inserts a hand and pushes the mid door, the mid door 591 does not optionally rotate and open.

On the other side, when the standard tape cassette C10 or the small tape cassette C20 is received, the standard tape cassette C10 or the small tape cassette C20 respectively pushes the sensing switch 751 or 752 and turns a contact point on, accordingly the electric signal of the sensing switches 751 or 752 is transmitted to the tray loading motor 351 and finally the tray loading motor 351 is rotated in the reverse direction.

According to the reverse rotation of the tray loading motor 351, the power of the tray loading motor 351 is transmitted to the cam gear 360 through the driving pulley 381, the belt 383, the driven gear pulley 382, the relaying gear 385 and the cam gear 360 and finally rotates both sides cam gears 360 and 370 in the reverse direction. Accordingly, the cassette tray 500 which is received the standard tape cassette C10 or the small tape cassette C20 can be loaded to the inside of the cassette housing 300.

At this time, according to pushing the short hooking protrusion 594 of the mid door 591 by the long hooking protrusion 595 of the cassette holder 540, the mid door 591 overcomes the elasticity of the elastic member 593, rotates in a counterclockwise direction and is opened. So the loading of the cassette tray is possible.

In the mean time, when the standard tape cassette C10 or the small tape cassette C20 is received at the cassette holder 540, the locking of the lids C11 and C12 are respectively released by different locking releasing devices. The different locking release devices will be described hereinafter.

First, when the standard tape cassette C10 is received at the cassette holder 540, the lid locking units C12 and C12 of the standard tape cassette C10 and both lock releasing fragments 650 of the cassette holder 540 are apart from each other with a predetermined distance. So, the lid locking of the standard tape cassette C10 is maintained.

Then, at the point of the finishing the loading operation of the cassette tray 500, the operating protrusion 656 of the lock releasing fragment 650 is hooked to the stopper brackets 670 and 670 which are respectively fixed to both front sides of the main chassis 1, the lock releasing fragment 650 overcomes the elasticity of the elastic member 660 and is pushed to the front. So, the lock releasing protrusion 651 of the lock releasing fragment 650 pushes both lid locking units C12 and C12 and releases the locking of the standard tape cassette C10.

Moreover, when the small tape cassette C20 is received to the cassette holder 540, the lid locking units C22 and C22 of the small tape cassette C10 and the lock releasing protrusion 681 of the lid lock releasing member 680 which is fixed to the lock releasing fragment 650 are apart from each other with a predetermined distance. So, the lid locking of the small tape cassette C20 is maintained.

Then, at the point of the finishing the loading operation of the cassette tray 500, the operating protrusion 656 of the lock releasing fragment 650 is hooked to the stopper brackets 670 and 670 which are respectively fixed to both front sides of the main chassis 1, the lock releasing fragment 650 overcomes the elasticity of the elastic member 660 and is pushed to the front. So, the lock releasing protrusion 681 of the lock releasing fragment 680 which is fixed to the lock releasing fragment 650 pushes the lid locking units C22 and releases the locking of the small tape cassette C10.

Meanwhile, at the point of finishing the loading operation of the cassette tray 500, the operating pin 577 of the cassette holder 540 is inserted to the hooking groove 562 of the compressing lever 560.

Then, by respectively forming the guide libs 313 and 323 for supporting the compressing lever 560 at the predetermined portion of the inside of the side brackets 310 and 320, if there has been the abrasion of the cam gears 360 and 370 and the racks 503 and 504, the compressing gear 560 is fixed at its position without flowing. Accordingly, at the point of the finishing the loading of the cassette tray 500, the operating pin 577 is exactly fitted in the hooking groove 562 of the compressing lever 560.

As above-mentioned, when the cassette tray 500 is loaded or ejected, the cam pin 561 of the compressing lever 560 which is rotatably combined with both sides of the side brackets 310 and 320 is inserted to the same diametric portion which is formed and guided at the first cam grooves 361 and 371 of the cam gears 360 and 370 and prevents the rotation of the compressing lever 560.

Hereafter, when the cam gears 360 and 370 are more rotated to a predetermined direction, the cam pin 561 of the compressing lever 560 moves to the larger diametric portion of the first cam grooves 361 and 371 and the compressing lever 560 which connects operating pin 577 of the cassette holder 500 at the pin inserting groove 602 rotates in a clockwise direction (referring to FIG. 33) about the shaft pin 312. Accordingly, the cassette holder 540 overcomes the elasticity of the first elastic member 551 and the second elastic member 552 which are supported by the fixing brackets 510 and 520 and is received to a predetermined portion of the deck mechanism 1.

Then, the fixing brackets 510 and 520 and the first and the second rising and falling levers 533 and 536 of the X-shaped lever assembly 530 which connects the cassette holder 540 are unfolded to guide the descending movement of the cassette holder 540.

Moreover, in the aforementioned receiving the cassette holder 540, the lid opener 297 which forms the first and the second lid opening units 295 and 296 as a single body is fixed to a predetermined portion of the upper surface of the main chassis 1. The lids C11 and C21 of the standard and the small tape cassette C10 and C20 are hooked to the first lid opening unit 295 or the second lid opening unit 296 of the lid opening unit 297 and the receiving of the cassette holder 540 is finished. At the point of the receiving of the hubs C16 and C16 of the standard tape cassette C10 or the small tape cassette C20 at the supply and take up reels 30 and 40 of the deck mechanism 100, the lids C11 and C21 of the standard tape cassette tape C10 or the small tape cassette C20 are fully opened. So, the withdrawal of the tape is possible.

At this time, as aforementioned, in the unloading the cassette tray 500 and receiving the cassette holder 540, the standard tape cassette C10 or the small tape cassette C20 received at the cassette holder 540 is elastically compressed. The elastic compressing of the tape cassettes will be described hereinafter.

As aforementioned, in the ejecting or unloading the cassette tray 500, the cam pin 722 of the operating lever 723 which is rotatably combined to both sides of the side brackets 310 and 320 is located at the same diametric portion of the second cam grooves 362 and 372 of the cam gears 360 and 370. Accordingly, the rotation of the operating lever 723 and the compressing plate 100 is prevented.

Hereafter, when the cam gears 360 and 370 additionally rotates in a predetermined direction for receiving the cassette holder 540, the cassette holder 540 which receives the standard tape cassette C10 or the small tape cassette C20 is descending and received. Simultaneously, the cam pin 722 of the operating lever 723 is located at the small diametric portion of the second cam grooves 362 and 372. Accordingly, by rotation of the operating lever 723 in a clockwise direction (referring to FIG. 53) about the shaft pin 721, the operating lever 723 overcomes the elasticity of the elastic member 724 and rotates the compressing plate 710 in a counterclockwise direction.

Then, when the standard tape cassette tape C10 is received at the cassette holder 540, the elastic compressing unit 731 of the first compressing member 730 which is respectively equipped at both center sides of the compressing plate 710 contacts both upper center sides of the standard tape cassette C10 and elastically supports it. Simultaneously, the second compressing member 740 which is fixed to both peripheries of the compressing plate 710 rotates about the connecting pin 742. Accordingly, the elastic compressing unit 743 of the second compressing member 740 elastically contacts both upper surface peripheries of the standard tape cassette C10.

Moreover, when the small tape cassette C20 is received at the cassette holder 540, the elastic compressing unit 731 of the first compressing unit 730 elastically supports the small tape cassette C20 without flowing of the small tape cassette C20 by contacting both upper peripheries of the small tape cassette C20.

Hereafter, the program switch gear 701 is interlocked with the small gear 363 of the one side of the cam gear 360. The elastic brush 702 is attached to the inner periphery of the program switch gear 701. The FPC 704 which contacts the elastic brush 702 and has a predetermined pattern is attached and fixed at the inner periphery of the side bracket 310, wherein the side bracket 310 supports the cam gear 360. By the contacting the elastic brush 702 and the pattern 703, the movement such as ejecting and loading of the cassette tray 500, loading and gradational receiving of the cassette holder 540 is exactly detected by the FPC 704.

For preparing the loading the standard tape cassette C10 or the small tape cassette C20, each structural element of the deck mechanism 100 works simultaneously with aforementioned the loading movement of the cassette tray 500 and the receiving of the cassette holder 540.

The above-mentioned tape loading will be described in detail hereinafter. When the standard tape cassette C10 or the small tape cassette C20 is received at the cassette holder 540 of the cassette tray 500, according to the driving force of the tray loading motor 351, the cassette tray 500 is loaded. Simultaneously, by the driving force of the loading motor 71, the power of the loading motor 71 is transmitted to the loading plate 80 through the worming gear shaft 72, the first loading gear 73, the program switch gear 75, the second loading gear 78 and the loading plate 80 and finally the power of the loading motor 71 rectilinearly moves the loading plate 80 back and forth.

Figure 26:
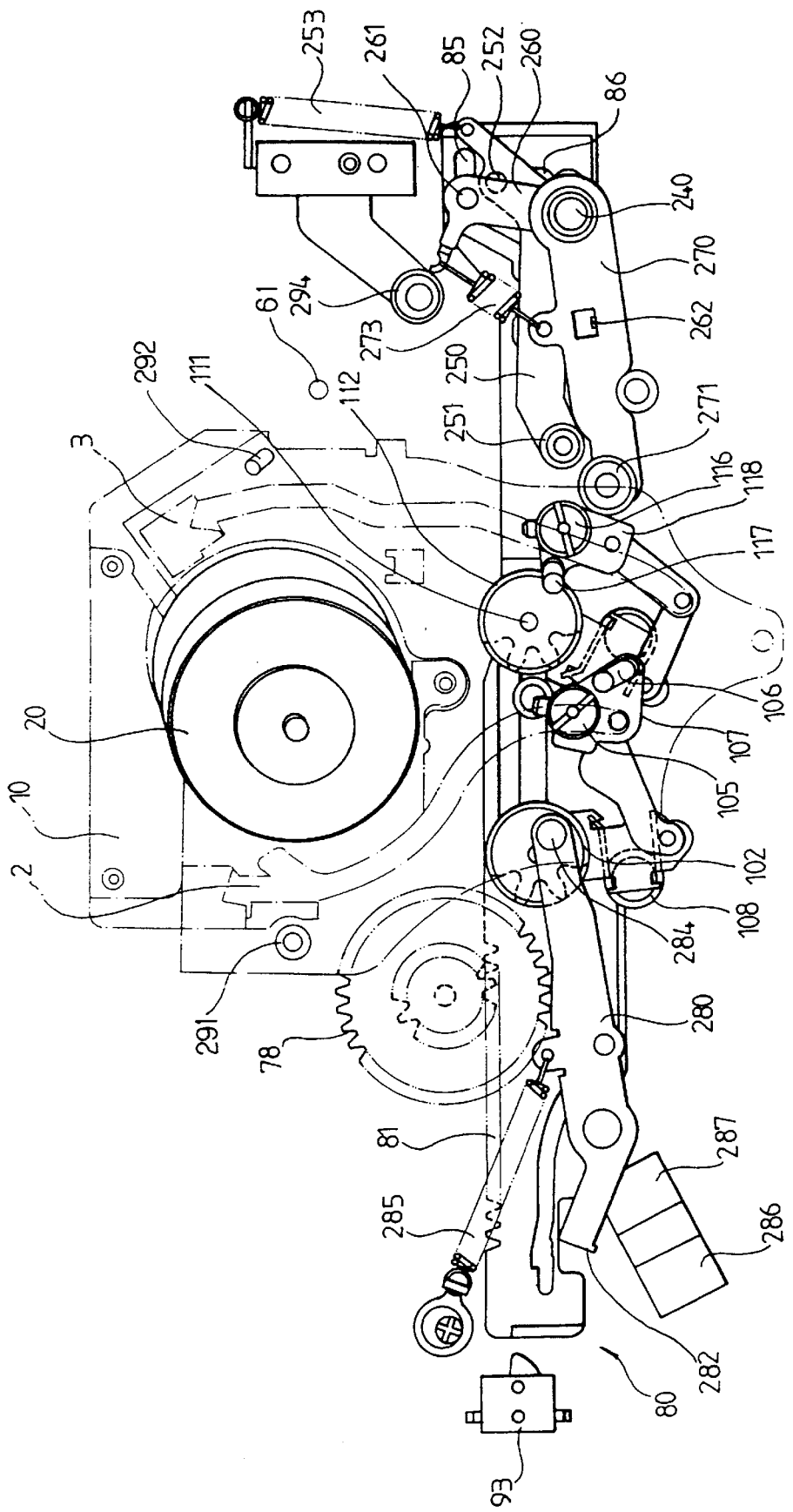
Figure 27:
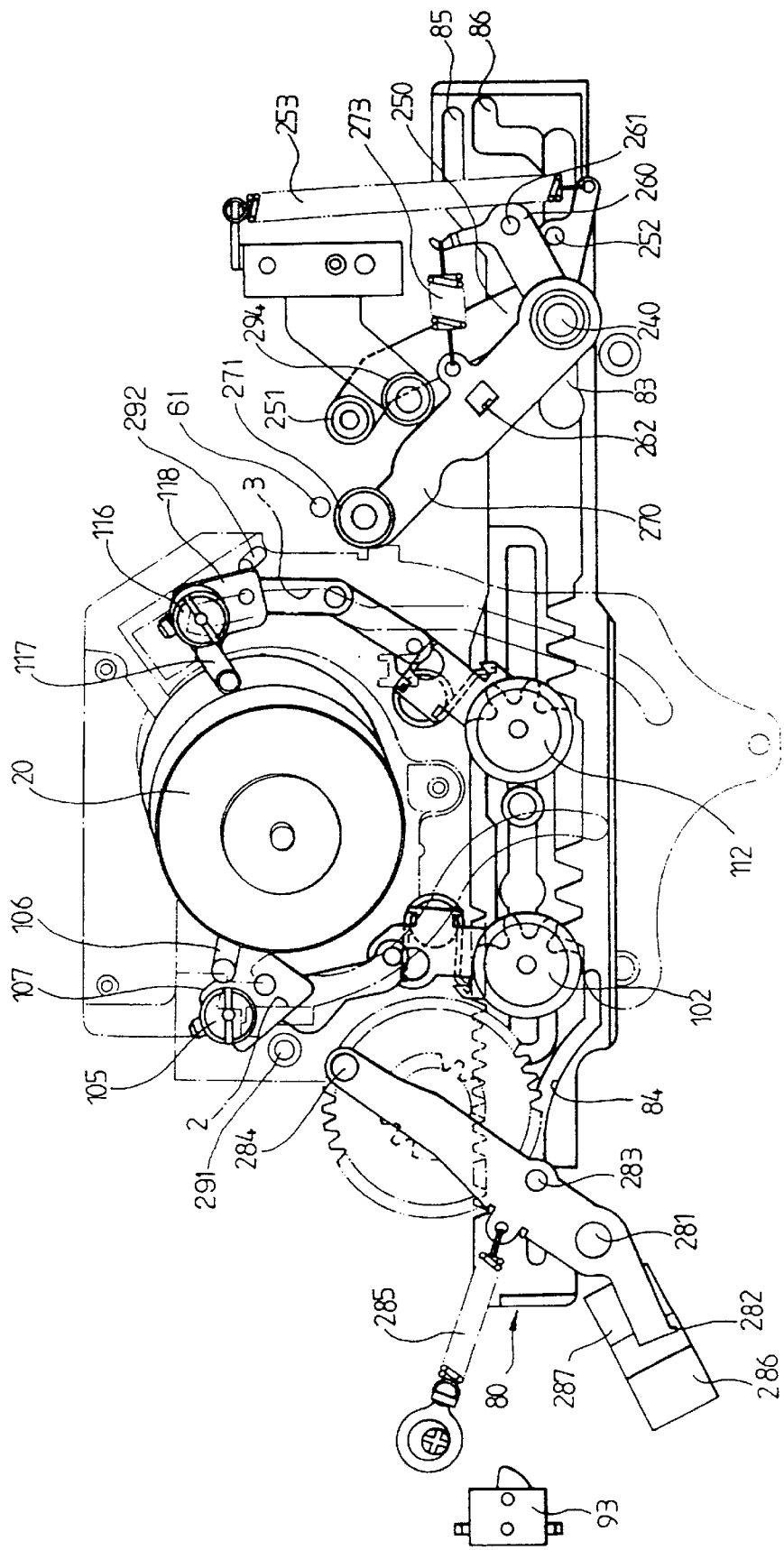

The loading plate 80 is moved to the right direction with a predetermined interval in the drawings. It moves from the ejecting of the cassette tray 500 as shown in FIG. 25 to the unloading stop as shown in FIG. 26 in the drawings and becomes the unloading stop.

Then, when the rotation of the loading motor 71 is stopped in the unloading stop, the electric signal is simultaneously supplied to the driving motor 121 and the supply and take up reels 30 and 40 are moved to suitable positions for the standard tape cassette C10 or the small tape cassette C20.

Figure 15:
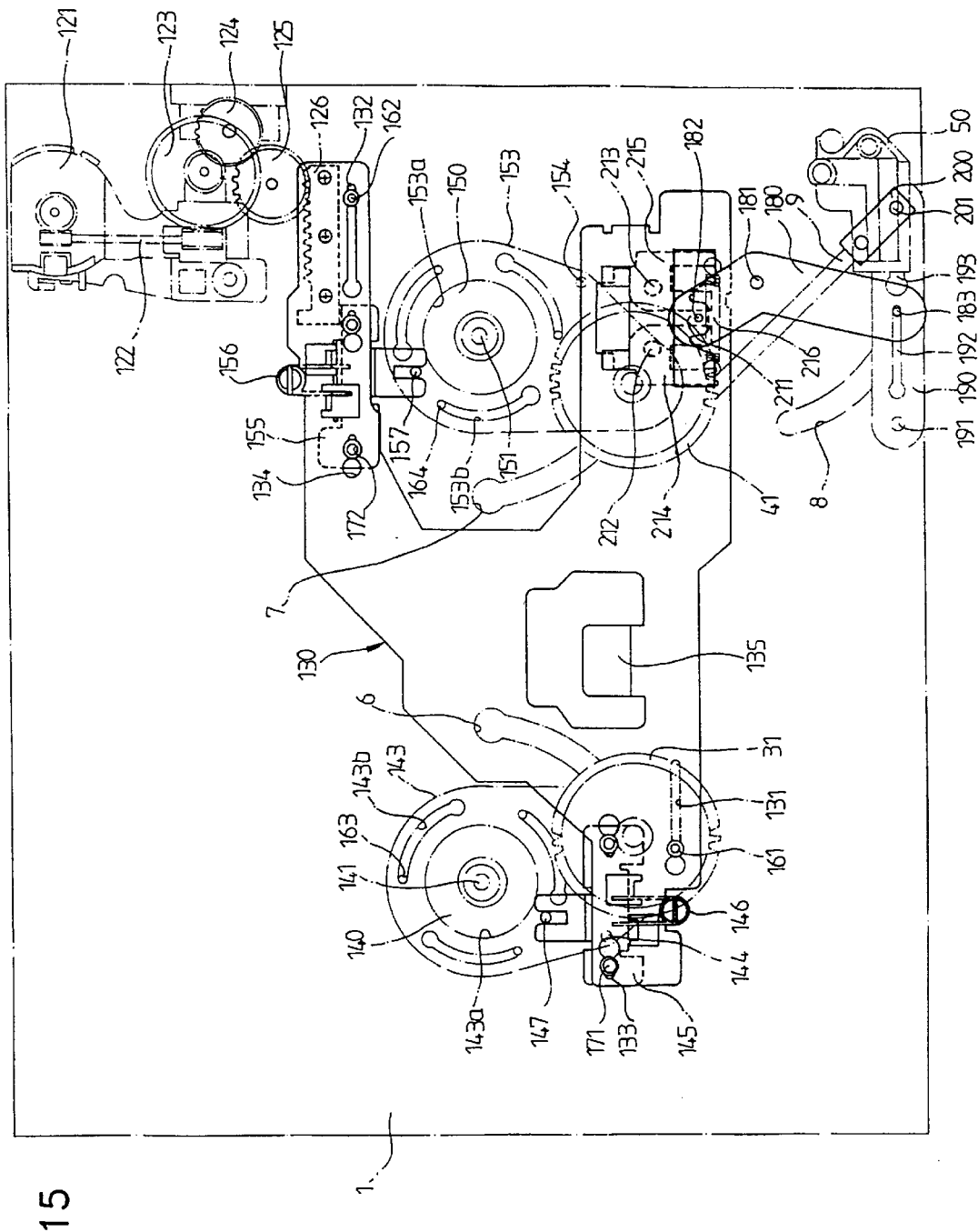
Figure 16:
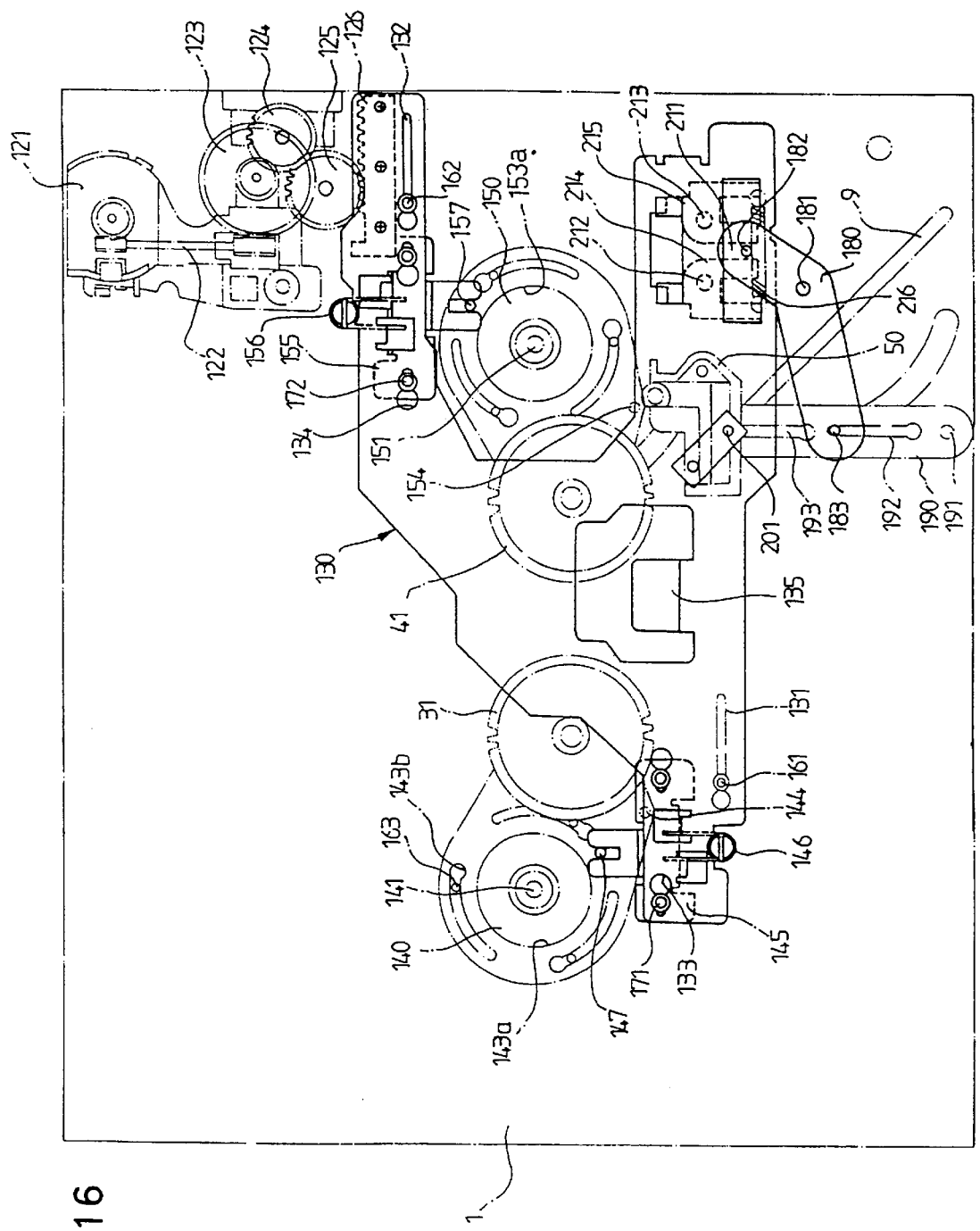
Figure 17:
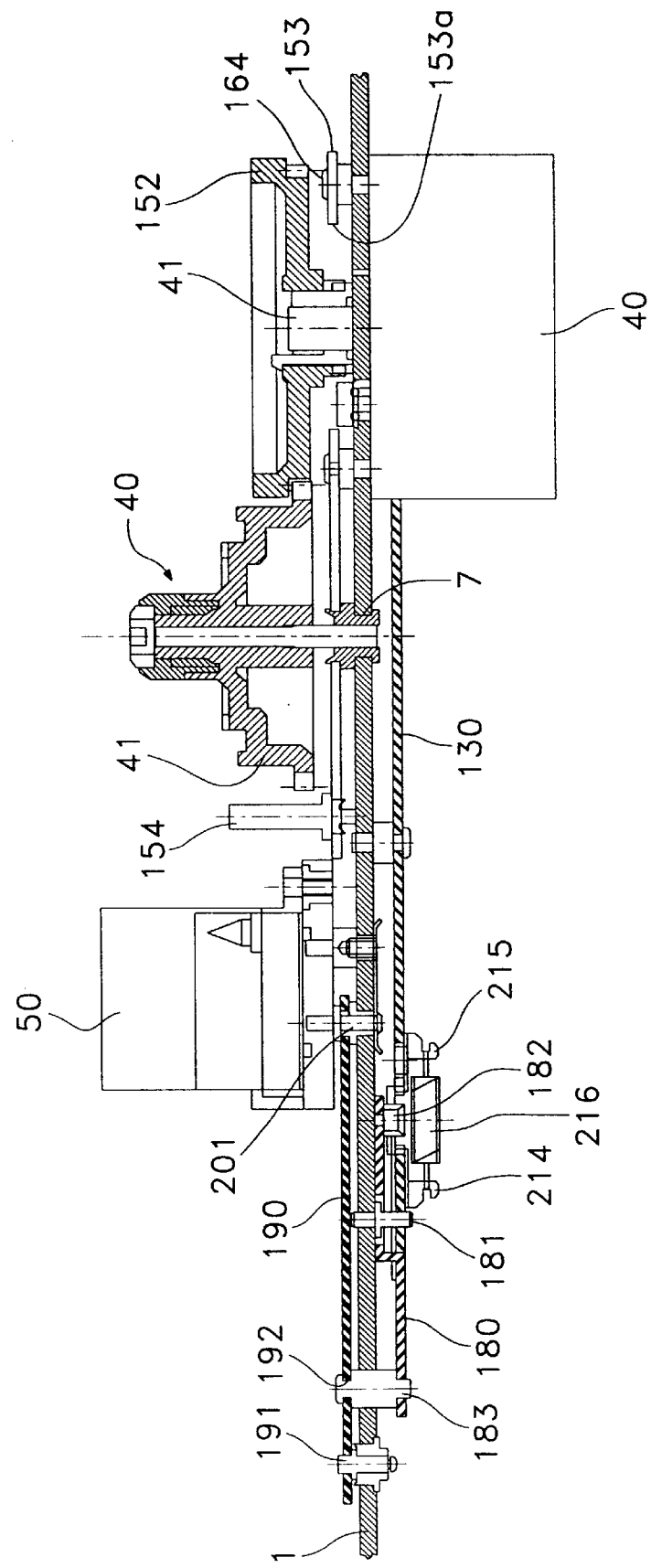
Figure 18:
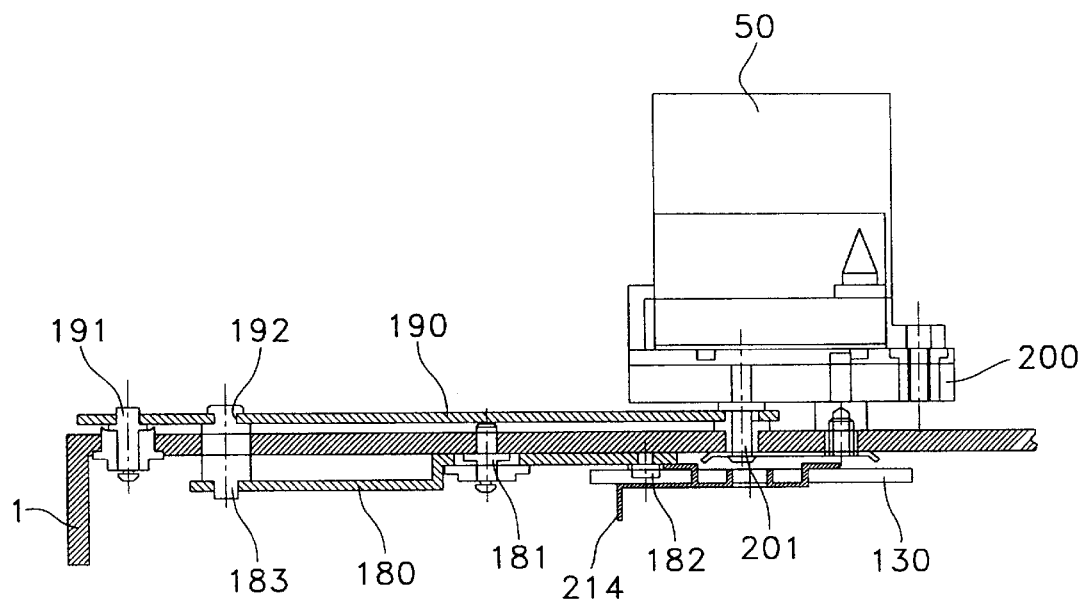
Figure 19:
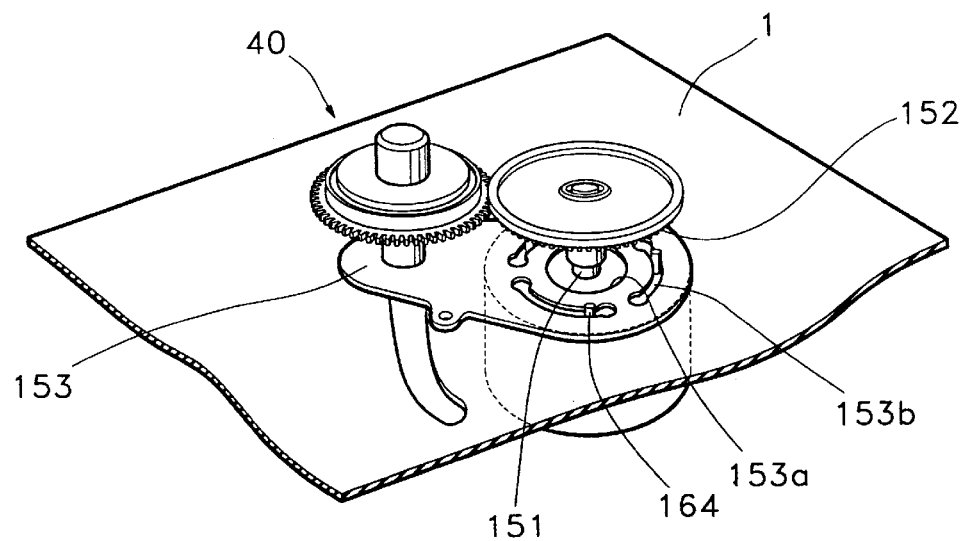
FIG. 19 is a perspective view illustrating the principal part of the reel moving device as shown in FIGS. 15 through 18.

In other words, when a user uses the standard tape cassette C10, the distance between the supply reel 30 and the take up reel 40 is widened and simultaneously, the MIC switch 50 is located at the corner portion of the main chassis 1, as shown in FIG. 15. When a user uses the small tape cassette C20, the distance between the supply reel 30 and the take up reel 40 is narrower and simultaneously, the MIC switch 50 is located at the center portion of the main chassis 1, as shown in FIG. 16.

The above-mentioned distance and position of the MIC switch will be described in detail hereinafter. The power of the driving motor 121 is transmitted to the rack gear 126 through the first driving gear 123, the second driving gear 124, the third driving gear 125 and the rack gear 126 and finally rectilinearly moves the moving plate 130 to the right direction or the left direction in the drawing.

The interlocking members 145 and 155 are combined with both sides of the moving plate 130 and the connecting pins 147 and 157 of the reel brackets 143 and 153 are combined with the interlocking members 145 and 155. So, each reel brackets 143 and 153 are widened to outward or narrowed to inward.

Then, by respectively installing the supply reel 30 and the take up reel 40 at both end portions of the reel brackets 143 and 153, the interval between the supply reel 30 and the take up reel 40 is automatically controlled according to the kinds of the tape cassettes such as a standard tape cassette C10 and a small tape cassette C20.

Simultaneously, by inserting the connecting pin 182 of the first operating member 180 at the hooking space part 211 of the first and the second connecting members 214 and 215 which are supported on one periphery of the moving plate 130, according to the movement of the moving plate 130 the first operating member 180 rotates about the shaft pin 181 and according to the rotation of the first operating member 180 the second operating member 190 rotates about the shaft pin 191

Accordingly, the slider 200 of the MIC switch 50 which is connected to the second operating member 190 moves along the slant slot 9. When the tape cassette is the standard tape cassette C10, the operating terminal 51 of the MIC switch 50 contacts the outer terminal C13 of the standard tape cassette C10 at the corner portion of the main chassis 1. When the tape cassette is the small tape cassette C20, the operating terminal 51 of the MIC switch 50 contacts the outer terminal C23 of the small tape cassette C20 at the center portion of the main chassis 1.

Moreover, as shown in FIG. 20, the hooking recess 153 is folded at the center portion of the moving plate 130. When the standard tape cassette C10 is received at the cassette holder 540, the hooking recess 153 is deviated from the right lower portion of the small cassette release 136, so the small cassette release 136 overcomes the elasticity of the elastic member 138 and maintains descending. When the small tape cassette C20 is received at the cassette holder 540, the descending of the small cassette release 136 is prevented by the movement of the moving plate 130 and position of the hooking recess 135 at the right lower portion of the small cassette release 136, accordingly, the locking of the small tape cassette C20 is released by the small cassette release 136.

As aforementioned, the receiving movement of the cassette holder 540 is progressing with setting the position of the supply reel 30, the take up reel 40 and the MIC switch 50, according to the kinds of the tape cassettes. The loading is waited by combining the hubs C16 or C26 of the standard tape cassette C10 or the small tape cassette C20, which is received in the cassette holder 540, with the supply reel 30 and the take up reel 40.

Then, when the loading signal is applied to the standard tape cassette C10 or the small tape cassette C20, the loading plate 80 is rectilinearly moved to the right direction in the drawing by the driving power of the loading motor 71, accordingly, the tension post 284 of the tension lever 280, the supply part and the take up part guide rollers 105 and 116, the supply part and the take up part slant poles 106 and 107, the pinch roller 271 of the pinch arm 270 and the review pole 251 of the review arm 271 guide a tape, moves to a predetermined direction and forms a tape winding system.

In other words, when the guide pin 283 of the tension lever 280 is inserted at the tension lever driving cam groove 84 of the loading plate 80, by the movement of the loading plate 80, the tension lever 280 rotates in a counterclockwise direction about the shaft pin 281 and guides the tape and moves.

When the fold 282 is downward folded at the end portion of the tension lever 280 and passes through between the light emitting sensor 286 and the light receiving sensor 287, the tape tension is suitably controlled by controlling the torque of the reel motors according to sense the light amount of the light emitting sensor 286 and the light receiving sensor 287.

Moreover, when the supply part and the take up part loading arm gears 102 and 112 are interlocking with both gear tooth 87 and 88 of the loading plate 80, so, the supply part loading arm 103, the supply part loading link 104, the take up part loading arm 113 and the first and the second take up part loading links 114 and 115 which are respectively connected to the loading arm gears 102 and 112 are driven by the rotation of the supply part and the take up part arm gears 102 and 112 according to the movement of the loading plate 80. Accordingly, the supply part and the take up part pole bases 107 and 118 are moved along both loading guide grooves 2 and 3 of the drum base 10.

Then, the tape loading is possible by respectively equipping with the supply part and the take up part guide rollers 105 and 116 and the supply part and the take up part slant poles 106 and 117 at the supply part and the take up part pole bases 107 and 118.

Moreover, by respectively inserting the guide pin 252 of the review arm 250 and the hook guide pin 261 of the pinch plate 260 at the review arm driving cam groove 86 and the pinch arm driving cam groove 85 of the loading plate 80, the review arm 250 and the pinch plate 260 rotate in a clockwise direction about the shaft pin 240 and the pinch arm 270 which is connected to the pinch plate 260 by the elastic member 273 rotates with the pinch plate 260 and accordingly, the review pole 251 and the pinch roller 271 move with guide the tape.

Figure 28:
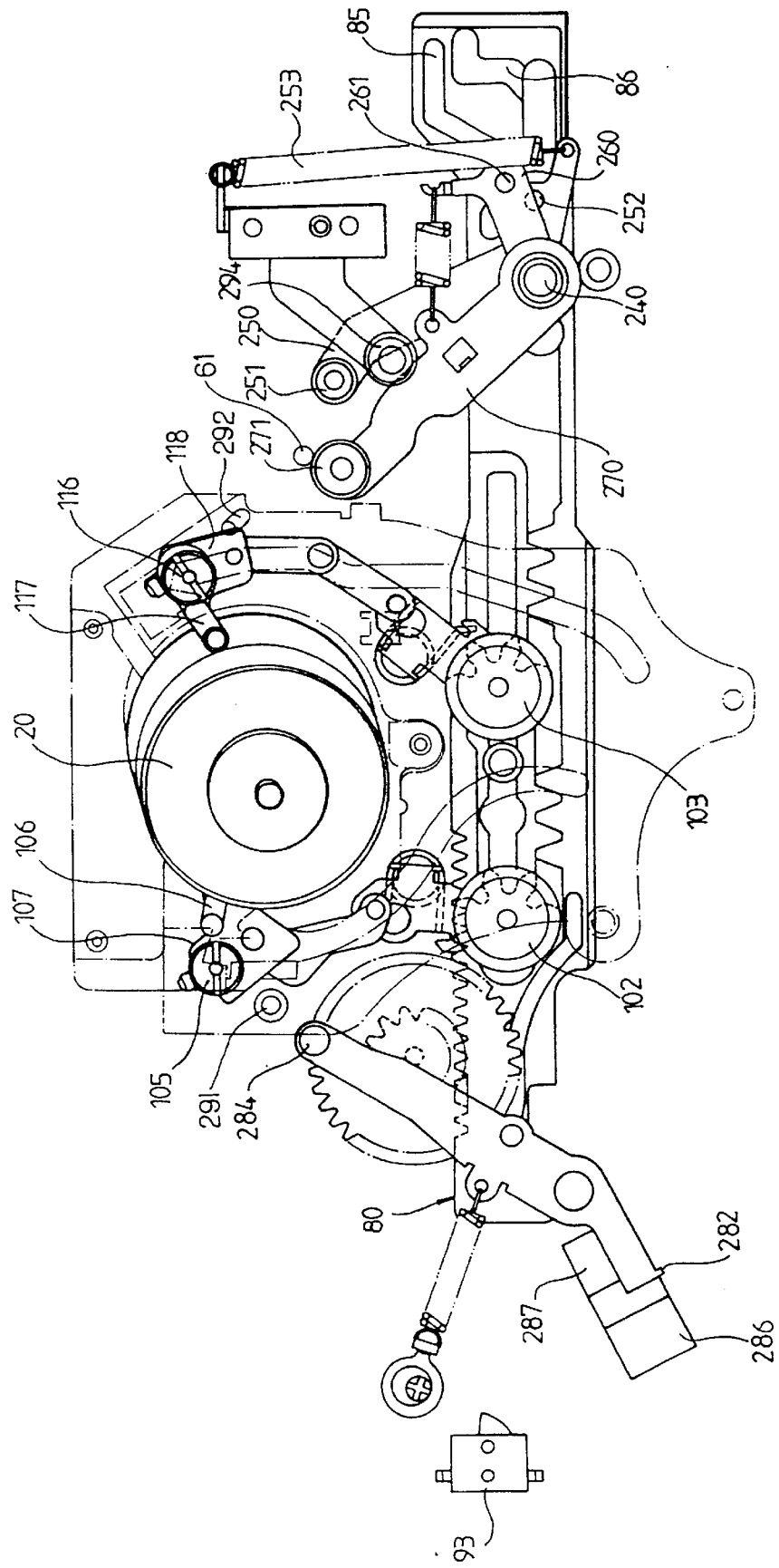

FIG. 28 illustrates the play mode of the tray loading type magnetic recording and reproducing apparatus according to the present invention. In the play mode, the tape winding system includes the tension post 284, the guide roller 291, the supply part guide roller 105, the supply part slant pole 106, the rotating head drum device 20, the take up part guide roller 116, the take up part slant pole 117, the fixing slant pole 292, the capstan shaft 61 the pinch roller 271, the review pole 251 and the guide roller 294.

The pinch roller 271 contact the capstan shaft 61 with a predetermined pressure and the traveling of the tape is possible by the rotation of the capstan shaft according to the driving of the capstan motor 60.

Then, the supply part and the take up part reel motors 140 and 150 also drive and the driving power of the supply part and the take up part motors 140 and 150 is transmitted to the reel gears 31 and 41 of the supply and the take up reels 30 and 40 using the reel driving gears 142 and 152, and accordingly, the traveling of the tape is harmoniously executed.

Figure 29:
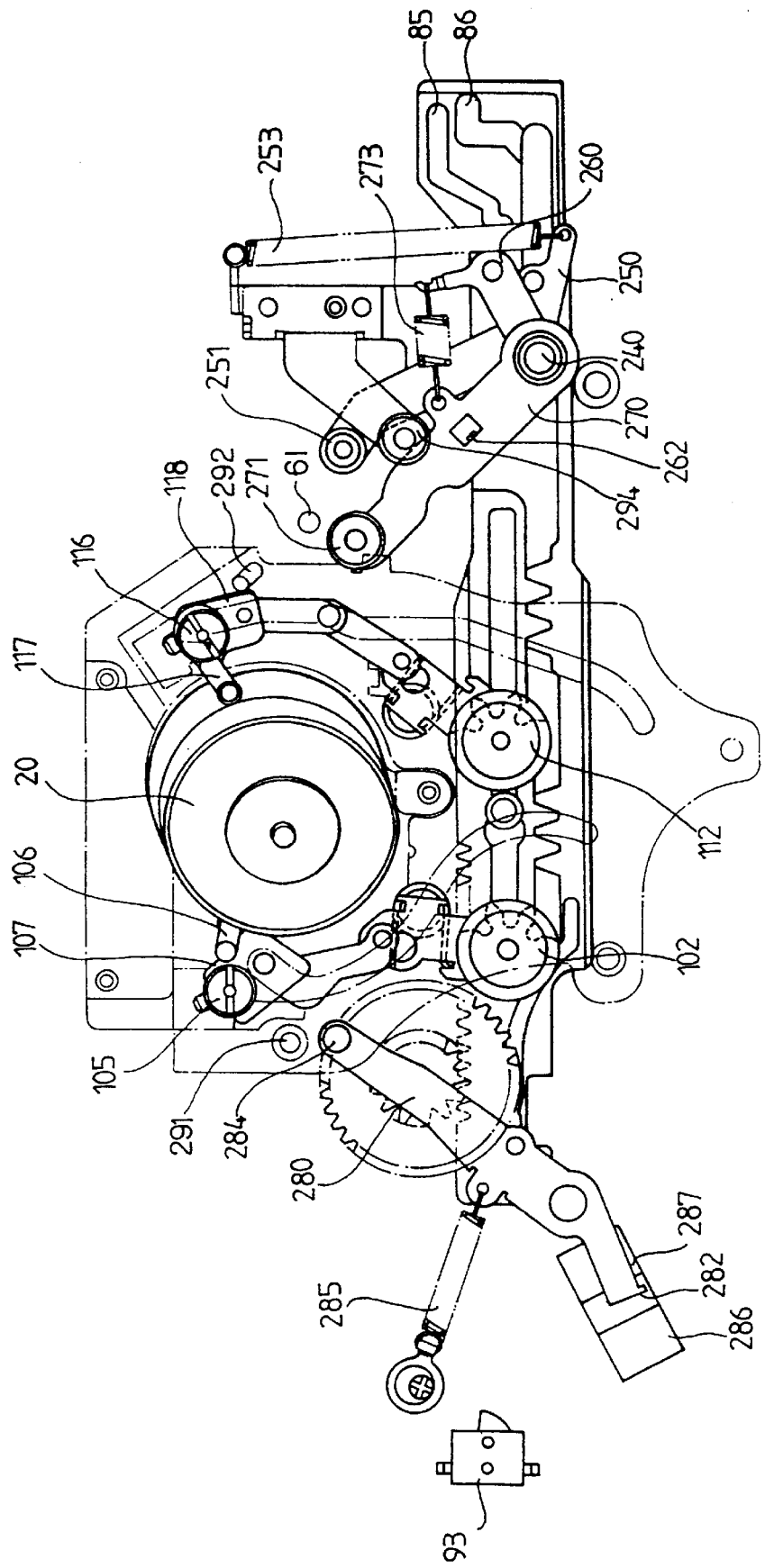

FIG. 29 illustrates the fast forward and the rewinding modes of the tray loading type magnetic recording and reproducing apparatus according to the present invention. When the pinch roller 271 is parted from the capstan shaft 61 with a predetermined distance, the fast forward and the rewinding modes are executed by the driving of the supply part and the take up part reel motors 140 and 150.

In the meantime, FIG. 22 illustrates the state when the braking power is not applied to the supply and the take up reels 30 and 40. When the braking power is applied to the supply and the take up reels 30 and 40 and the power is applied to the solenoids 220 and 230, the brake levers 222 and 232 overcome the elasticity of the elastic members 225 and 235 and move to a predetermined direction, accordingly, as shown in FIG. 23, the brake bands 224 and 234 of the brake levers 222 and 232 contact the reel driving gears 142 and 152 with a predetermined pressure and stop the supply part and the take up part reel gears 31 and 41 which are interlocked with the reel driving gears 142 and 152, and accordingly, the rotation of the supply reel 30 and the take up reel 40 is prevented.

The tray loading type magnetic recording and reproducing apparatus according to the present invention, has been described above with reference to the aforementioned embodiments. It is evident, however, that many alternative, modification and variations will be apparent to those skilled in the art in light of the foregoing description. Accordingly, it is intended to embrace all such alternatives, modifications and variations as fall within the spirit and scope of the appended claims.

As above-mentioned in detail, the tray loading type magnetic recording and reproducing apparatus includes: the deck mechanism for accommodating different sized two-typed tape cassettes; the cassette housing which is covered and fixed at the upper surface of the deck mechanism; the cassette tray which is combined with the cassette housing in such a manner that the cassette tray can be rectilinearly moved back and forth and being capable of selectively accommodating different sized tape cassettes; the tray loading device for loading the cassette tray; and the cassette holder receiving device for receiving a tape cassette received in the cassette tray in a predetermined position of the deck mechanism. So, it is therefore an effect of the present invention to provide a new formed tray loading type magnetic recording and reproducing apparatus for accommodating different sized tape cassettes, capable of simplifying its formation, reducing fabricating cost and using in a home.

What is claimed is:

1. A tray loading type magnetic recording and reproducing apparatus for different size tape cassettes, comprising:
    a deck mechanism for accommodating said different size tape cassettes;
    a cassette housing affixed to an upper portion of said deck mechanism;
    a cassette tray rectilinearly combined with said cassette housing, wherein said cassette tray moves back and forth and selectively accommodates said different size tape cassettes;
    a cassette holder for selectively receiving said different size tape cassettes, which is provided in said cassette tray; and
    a tape cassette receiving device for receiving said different size tape cassettes, which is provided in the cassette holder,
    wherein said cassette holder is separated into a lower base and an upper base which is rotatable combined with a rear side of said lower base, and
    wherein said tape cassette receiving device comprises:
        a supporting pin which is combined with a supporting grove formed at both sides of a lower surface of a small tape cassette and which moves to an escaping groove formed in a hub of a standard tape cassette when said standard tape cassette is received, and
        driving means for moving said supporting pin by said standard tape cassette that is received in said cassette holder.

2. The tray loading type magnetic recording and reproducing apparatus according to claim 1, wherein said deck mechanism includes a loading plate comprising a plurality of cam grooves for respectively driving a tension lever, a pinch arm, a review arm and tension poles, which is rectilinearly moved back and forth by a loading motor, for loading and unloading said different size tape cassettes.

3. The tray loading type magnetic recording and reproducing apparatus according to claim 1, wherein said deck mechanism fixes a light emitting sensor and a light receiving sensor at a predetermined portion on a main chassis which is adjacent to said tension lever, wherein said tape cassette is wound on said main chassis, is equipped with a sensing unit which passes through said light emitting sensor and said light receiving sensor according to a strength of said tape tension at an end portion of said tension lever, and controls torque of a reel motor by an amount of sensing light from said light emitting sensor and said light receiving sensor.

4. The tray loading type magnetic recording and reproducing apparatus according to claim 1, wherein said deck mechanism includes a reel moving device for moving a supply reel and a take up reel to a predetermined position in accordance to said different size tape cassettes, wherein said reel moving device comprises:
   a power generating means located at a predetermined portion of a main chassis;
   a moving plate rectilinearly moved in accordance to power transmission from said power generating means;
   a reel bracket for converting rectilinear movement of said moving plate into rotational movement; and
   a reel gear for supplying and or taking up said different size tape cassettes which is located at an opposite side of a rotating shaft of said reel bracket.

5. The tray loading type magnetic recording and reproducing apparatus according to claim 4, wherein rotational movement of said supply reel is opposite from rotational movement of said take up reel when said reel bracket is rotating.

6. The tray loading type magnetic recording and reproducing apparatus according to claim 4, wherein a hooking recess is formed at a predetermined portion of said moving plate; and a small tape cassette release is elastically supported by an elastic member at a center portion of said main chassis, said small tape cassette release ascends and descends, and descending movement of said small tape cassette release is restricted by said hooking recess according to the movement of said moving plate.

7. The tray loading type magnetic recording and reproducing apparatus according to claim 4, wherein said reel moving device is interlocked with said moving plate.

8. The tray loading type magnetic recording and reproducing apparatus according to claim 1 or 7, wherein said deck mechanism includes a switch moving device for a tape cassette sensing means for moving said tape cassette sensing means to a predetermined portion in accordance to said different size tape cassettes, said switch moving device comprises:
   a power generating means;
   a moving plate rectilinearly moved in accordance to power transmission from said power generating means; and
   an operating member for converting a moving direction of said moving plate,
   wherein said tape cassette sensing means is located at a slider that is reciprocally moved between an outside portion and an inside portion of a main chassis by said operating member.

9. The tray loading type magnetic recording and reproducing apparatus according to claim 8, further comprising an elastic means disposed between said moving plate and said operating member.

10. The tray loading type magnetic recording and reproducing apparatus according to claim 1, wherein said cassette holder is respectively equipped with a supporting means for supporting each periphery of said tape cassette at predetermined portions of said lower base and said upper base.

11. The tray loading type magnetic recording and reproducing apparatus according to claim 10, further comprising a lock releasing means for releasing lid locking units of a small tape cassette, an elastic means for elastically supporting said lock releasing means in one direction, and an operating means interlocked with said lock releasing means and formed at side portions of a main chassis.

12. The tray loading type magnetic recording and reproducing apparatus according to claim 10, wherein a hooking unit of said upper base is hooked to a stopper of said cassette housing, and said upper base is rotated in an upward direction by hooking said hooking unit on the rear end portion of said upper base and stopping said stopper at a predetermined portion on said cassette housing when an unloading operation of said cassette tray is finished.

13. The tray loading type magnetic recording and reproducing apparatus according to claim 1, further comprising a tray loading device for performing loading and unloading operations, said tray loading device comprises:
   a power generating means located at one side portion of said cassette housing;
   a cam gear rotatably supported by power from said power generating means; and
   a rectilinear movement guide means for rectilinearly moving said cassette tray by the rotation of said cam gear.

14. The tray loading type magnetic recording and reproducing apparatus according to claim 13, wherein said tray loading device further comprises a cassette holder receiving device for receiving said tape cassette received in said cassette tray in a predetermined portion of said deck mechanism, and said cassette holder receiving means comprising a first cam means formed at said cam gear, and a cassette holder descending means combined with said first cam means.

15. The tray loading type magnetic recording and reproducing apparatus according to claim 14, wherein said cassette holder receiving device further comprises a tape cassette compressing mechanism operable to restrict movement of said tape cassette received in said cassette tray by compressing said tape cassette, wherein said tape cassette compressing mechanism comprises a second cam means formed at said cam gear, and a compressing means interlocked with said second cam means.

16. The tray loading type magnetic recording and reproducing apparatus according to claim 1, further comprising a tape cassette compressing mechanism, comprising:
   a compressing member rotatably combined at a rear portion of said cassette housing;
   a compressing means compressing said tape cassette by rotation of said compressing member; and
   a compressing driving means for providing rotational power to said compressing member.

17. The tray loading type magnetic recording and reproducing apparatus according to claim 1, wherein said driving means comprises:
   a first rotating member rotatably connected to a lower surface of said lower base;
   a compressing member fixed to an upper surface of said first rotating member and guided by said standard tape cassette;
   elastic means for elastically supporting said first rotating member;
   a guide member which is located between said upper base and said lower base of said cassette holder, and moved by the rotation of said first rotating member; and
   a second rotating member that is rotatably connected to both sides of said cassette holder, and equipped with said supporting pin and rotated by the movement of said guide member.

18. The tray loading type magnetic recording apparatus according to claim 17, wherein said compressing member has a slope surface for making it easy to receive said standard tape cassette.

19. A tray loading type magnetic recording and reproducing apparatus, comprising:
- a deck mechanism for accommodating different size tape cassettes;
- a cassette housing affixed to an upper portion of said deck mechanism; and
- a cassette tray rectilinearly combined with said cassette housing, wherein said cassette tray moves back and forth and selectively accommodates said different size tape cassettes,
- wherein said deck mechanism includes a loading plate comprising a plurality of cam grooves for respectively driving a tension lever, a pinch arm, a review arm and tension poles, which is rectilinearly moved back and forth by a loading motor, for loading and unloading said different size tape cassettes.

20. A tray loading type magnetic recording and reproducing apparatus, comprising:
- a deck mechanism for accommodating different size tape cassettes;
- a cassette housing affixed to an upper portion of said deck mechanism; and
- a cassette tray rectilinearly combined with said cassette housing, wherein said cassette tray moves back and forth and selectively accommodates said different size tape cassettes,
- wherein said deck mechanism fixes a light emitting sensor and a light receiving sensor at a predetermined portion on a main chassis which is adjacent to a tension lever mounted thereon, and when said tape cassette is received on said main chassis, an element operatively associated with said tension lever passes through said light emitting sensor and said light receiving sensor according to a strength of said tape tension at an end portion of said tension lever, and controls torque of a reel motor by an amount of sensing light from said light emitting sensor and said light receiving sensor.

21. A tray loading type magnetic recording and reproducing apparatus, comprising:
- a deck mechanism for accommodating different size tape cassettes;
- a cassette housing affixed to an upper portion of said deck mechanism; and
- a cassette tray rectilinearly combined with said cassette housing, wherein said cassette tray moves back and forth and selectively accommodates said different size tape cassettes,
- wherein said deck mechanism includes a switch moving device for a tape cassette sensing means for moving said tape cassette sensing means to a predetermined portion in accordance to said different size tape cassettes, said switch moving device comprises:
  - a power generating means;
  - a moving plate rectilinearly moved in accordance to power transmission from said power generating means; and
  - an operating member for converting a moving direction of said moving plate,
- wherein said tape cassette sensing means is located at a slider that is reciprocally moved between an outside portion and an inside portion of a main chassis by said operating member.

22. A tray loading type magnetic recording and reproducing apparatus, comprising:
- a deck mechanism for accommodating different size tape cassettes;
- a cassette housing affixed to an upper portion of said deck mechanism;
- a cassette tray rectilinearly combined with said cassette housing, wherein said cassette tray moves back and forth and selectively accommodates said different size tape cassettes,
- wherein said deck mechanism includes a switch moving device for a tape cassette sensing means for moving said tape cassette sensing means to a predetermined portion in accordance to said different size tape cassettes, said switch moving device comprises:
  - a power generating means;
  - a moving plate rectilinearly moved in accordance to power transmission from said power generating means; and
  - an operating member for converting a moving direction of said moving plate,
- wherein said tape cassette sensing means is located at a slider that is reciprocally moved between an outside portion and an inside portion of a main chassis by said operating member; and
- an elastic means disposed between said moving plate and said operating member.

23. A tray loading type magnetic recording and reproducing apparatus, comprising:
- a deck mechanism for accommodating different size tape cassettes;
- a cassette housing affixed to an upper portion of said deck mechanism;
- a cassette tray rectilinearly combined with said cassette housing, wherein said cassette tray moves back and forth and selectively accommodates said different size tape cassettes; and
- a tape cassette compressing mechanism comprising:
  - a compressing member rotatably combined at a rear portion of said cassette housing;
  - a compressing means compressing said tape cassette by rotation of said compressing member; and
  - a compressing driving means for providing rotational power to said compressing member.

* * * * *